United States Patent [19]
Shibue et al.

[11] Patent Number: 5,621,537
[45] Date of Patent: Apr. 15, 1997

[54] COLOR SIGNAL PROCESSING CIRCUIT IN COLOR VTR

[75] Inventors: Shigenori Shibue; Yoshiaki Mimura, both of Nagaokakyo, Japan

[73] Assignee: Mitsubishi Denki Kabushiki Kaisha, Tokyo, Japan

[21] Appl. No.: 287,594

[22] Filed: Aug. 8, 1994

Related U.S. Application Data

[63] Continuation of Ser. No. 32,556, Mar. 17, 1993, abandoned, which is a continuation of Ser. No. 606,865, Oct. 31, 1990, abandoned.

[30] Foreign Application Priority Data

| Nov. 2, 1989 | [JP] | Japan | 1-286918 |
| Nov. 14, 1989 | [JP] | Japan | 1-296831 |
| Feb. 23, 1990 | [JP] | Japan | 2-43630 |
| Apr. 16, 1990 | [JP] | Japan | 2-100967 |

[51] Int. Cl.$^6$ ...................... H04N 9/89
[52] U.S. Cl. ............................ 386/17
[58] Field of Search .................... 358/310, 324, 358/326, 329, 330, 320; 360/36.1, 37.1; 348/503, 505, 549; H04N 9/89

[56] References Cited

U.S. PATENT DOCUMENTS

| 3,629,491 | 12/1971 | Dann | 358/326 |
| 3,704,341 | 11/1972 | Fujita | 358/326 |
| 4,554,596 | 11/1985 | Shibata et al. | 358/330 |
| 4,635,097 | 1/1987 | Tatami | 358/19 |
| 4,807,048 | 2/1989 | Yasuda | 358/326 |
| 4,956,720 | 9/1990 | Tomisawa | 358/326 |
| 4,991,026 | 2/1991 | Takase et al. | 358/329 |
| 5,083,197 | 1/1992 | Ko et al. | 358/326 |
| 5,083,213 | 1/1992 | Yasuda | 358/326 |

OTHER PUBLICATIONS

"NHK Home Video Technology" Nippon Hoso Kyokai, Apr. 20, 1980.

*Primary Examiner*—Thai Q. Tran
*Assistant Examiner*—Huy Nguyen

[57] ABSTRACT

In a home VTR, a color signal processing circuit is capable of reproducing a color signal recorded as a lower converted color signal and preventing color unevenness which necessarily creates during visualizing. To avoid an adverse effect due to phase fluctuation created during reproducing, the color signal processing circuit is provided with a circuit for synchronizing a carrier with the phase fluctuation. In this circuit, an open loop circuit is connected to a closed loop circuit to achieve such synchronization. Specifically, the phase fluctuation in a low-frequency range is synchronized by a feedback feature of the closed loop circuit, while the phase fluctuation in a high-frequency range is synchronized by a detecting feature of the closed loop circuit.

31 Claims, 18 Drawing Sheets

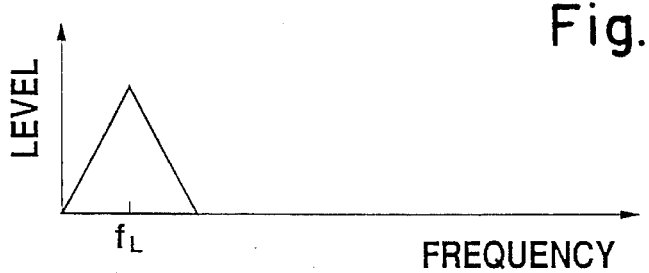
Fig. 2A
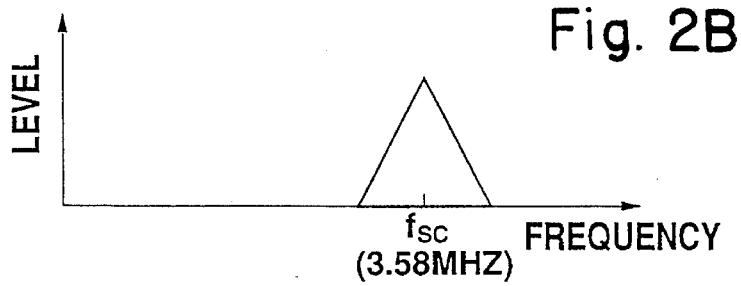
Fig. 2B
Fig. 3A
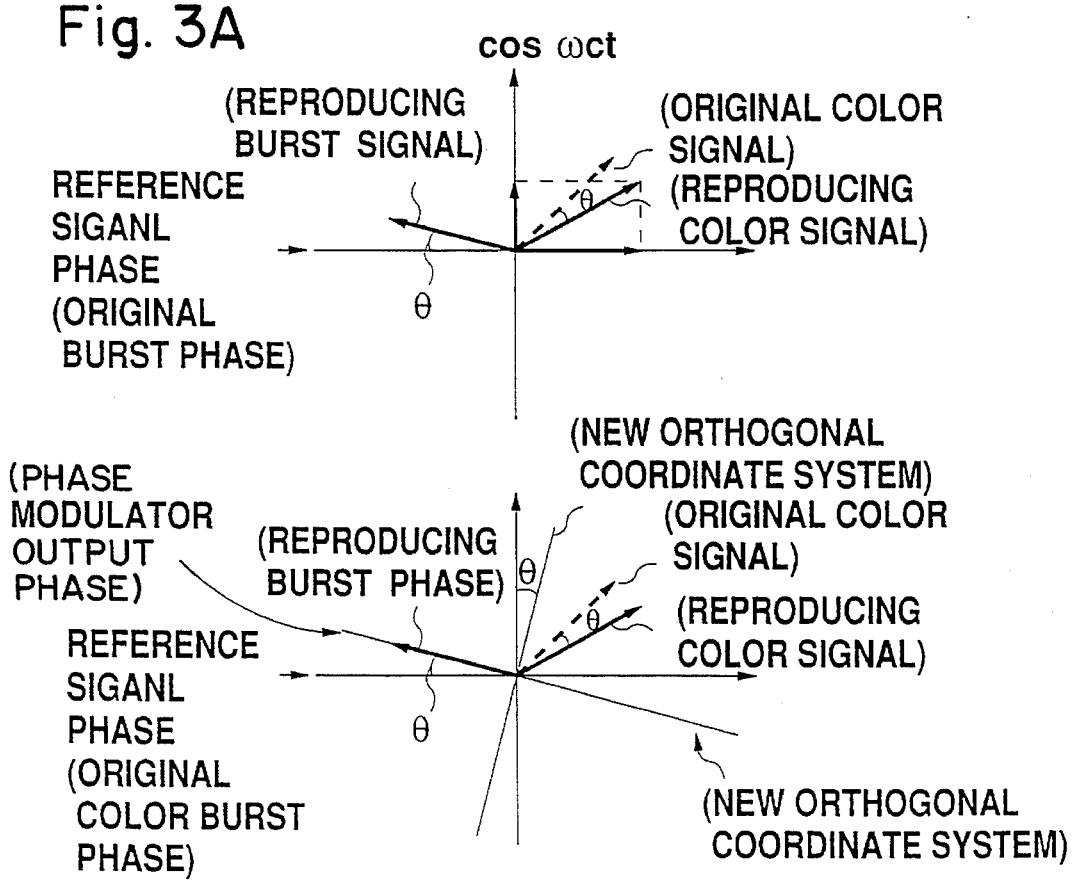
Fig. 3B

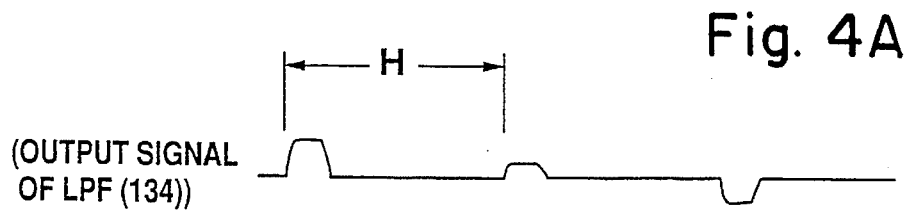
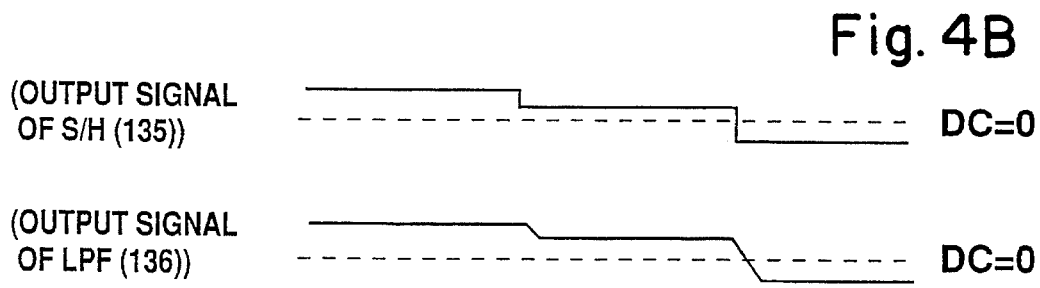
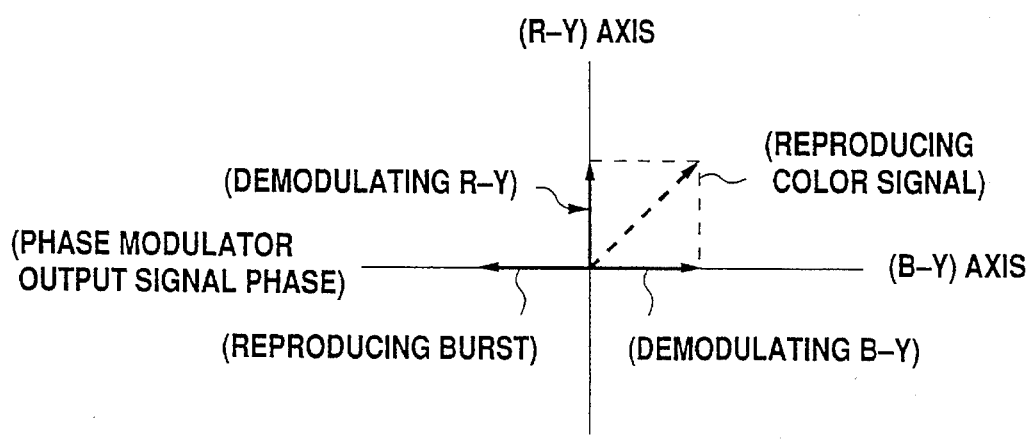
Fig. 5

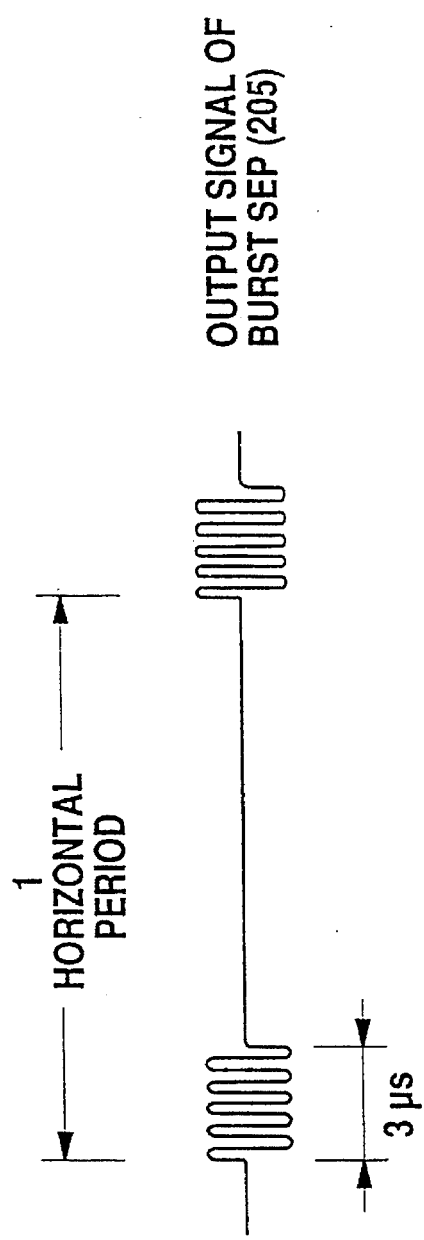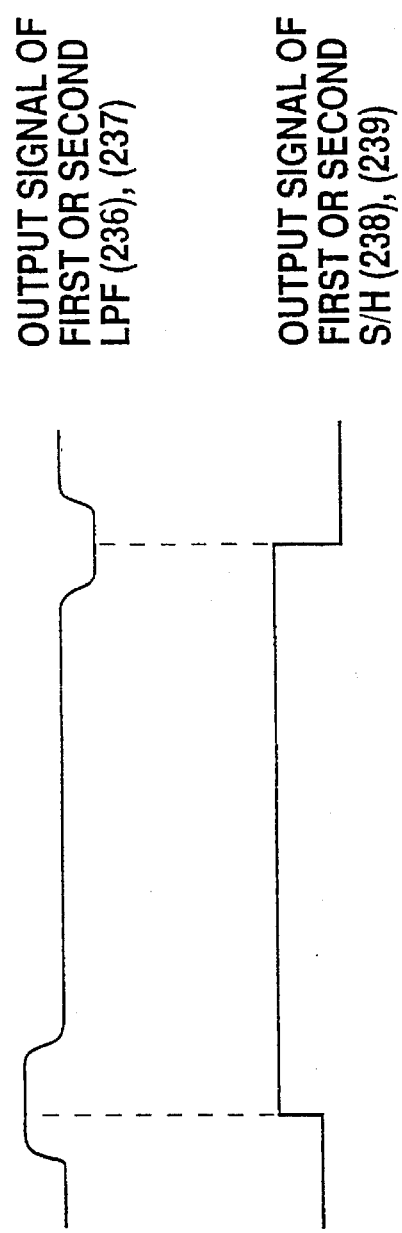
Fig. 8A  Fig. 8B  Fig. 8C $$H(S) = \frac{\theta o(S)}{\theta i(S)} = \frac{Ko\ Kd\ F(S)}{S + Ko\ Kd\ F(S)}$$

COLOR SIGNAL PROCESSING CIRCUIT IN COLOR VTR

This is a continuation of application Ser. No. 08/032,556 filed on Mar. 17, 1993, now abandoned, which is a continuation application of Ser. No. 07/606,865 filed on Oct. 31, 1990, now abandoned.

BACKGROUND OF THE INVENTION

1. Field of the Invention

This invention relates generally to a color signal processing circuit in a color video tape recorder (hereinafter called VTR), and more particularly, to a color signal processing circuit for correcting the phase of a color signal, which includes phase fluctuating components, when a video signal is reproduced by a VTR.

2. Description of the Related Art

FIG. 19 of the accompanying drawings shows a conventional color signal processing circuit disclosed in, for example, a magazine "NHK Home Video Technology" (pages 83–86) edited and published by Nippon Hoso Kyokai. In FIG. 19, reference numeral 1 designates an input terminal for a low-frequency-range color signal; 2, a low-pass filter (LPF) for removing unnecessary components other than the low-frequency-range color signal; 3, a first frequency converter, which is a multiplier, for converting the low-frequency-range into an initial frequency; 4, a first band-pass filter (BPF) for removing unnecessary components from an out-put signal of the first frequency converter 3; 5, a burst separator for separating color burst signal components from the output signal of the first band-pass filter; 6, a reference signal oscillator for generating a reference signal which is to be a phase reference of the output of the first band-pass filter; 7, a phase detector for performing phase comparison between the output signal of the burst separator 5 and the output of the reference signal oscillator 6; 8, a voltage control oscillator (hereinafter called VCO) which is controlled by the output of the phase detector 7; 9, a second frequency converter, which is a multiplier, for producing a product of the output signal of the reference signal oscillator; 10, a second band-pass filter (BPF) for removing unnecessary components of the output signal from the second frequency converter 9; and 11, an output terminal for a color signal.

The operation of the conventional circuit will now be described.

A low-frequency-range $f_L$ including a frequency shift $+\Delta f$ created due to a nonuniform feed of a tape, irregular rotation of a rotary drum or any other cause is inputted to the low-pass filter 2 from the input terminal 1. The low-pass filter 2 removes unnecessary frequency components from the inputted low-frequency-range color signal. An output signal of the low-pass filter 2 is supplied to a first frequency converter 3 and is thereby converted into an original color signal carrier frequency $f_{sc}$. For example, in the NTSC method, a frequency of 3.58 MHz is selected. The first frequency converter 3 creates many high frequency components other than necessary color signals, while the first band-pass filter removes unnecessary components. An output signal of the first band-pass filter 4 is supplied to the output terminal 11 to be a color signal output signal and is also supplied to the burst separator 5 only a color burst signal is extracted. An output signal of the burst separator 5, together with an output signal of the reference signal oscillator 6 which generates a reference signal $f_{sc}$ of 3.58 MHz, is supplied to the phase detector 7 where a phase difference between these two signals is detected.

Then an output of the phase detector 7, namely, a phase error signal controls the VCO 8 so as to generate a frequency $f_L$ equal to the low-frequency-range signal, which is inputted to the input terminal 1, plus/minus $\Delta f$. An output signal of the VCO 8, together with an output signal of the reference signal oscillator 6, is supplied to the second frequency converter 9 where a product of these two signals is produced. An output signal of the second frequency converter 9 includes frequency components $f_{sc}+F_L\pm\Delta f$ and $f_{sc}-f_L\pm\Delta f$, and therefore, only the components $f_{sc}+f_L\pm\Delta f$ are extracted by the second band-pass filter 10. The output signal of the second band-pass filter 10 determines a carrier frequency of the first frequency converter 3. As an output signal of the first frequency converter 3, a signal having frequency components $f_{sc}$ and $f_{sc}+2(f_L\pm\Delta)$ is obtained, but the component $f_{sc}$ is extracted by the first band-pass filter 4. Here the first frequency converter 3, the first band-pass filter 4, the burst separator 5, the phase detector 7, the VCO 8, the reference signal oscillator 6, the second frequency converter 9 and the second band-pass filter 10 jointly constitute a phase locked loop (hereinafter called "PLL circuit"), in which a closed loop is included such that the color burst signal phase of the output signal of the first band-pass filter 4 is normally synchronized with the phase of the output signal of the reference signal oscillator 6.

The operation characteristic of an ordinary PLL circuit will now be described with reference to FIG. 20.

In FIG. 20, a signal of $\Theta_1(s)$ (s: Laplace operator) is inputted to an input terminal 15 and is supplied to the phase detector 7. The phase detector 7 performs phase comparison between the phase $\Theta_1(s)$ of the input signal and a phase $\Theta_0(s)$ (described below) of the output signal of the VCO 8 to obtain a phase difference and outputs a voltage according to the phase difference. Here the ratio of output voltage with respect to the phase difference of the phase detector 7, namely, a conversion constant is represented by $K_d$. The output signal of the phase detector 7 includes many high frequency components. Therefore, if these high frequency components are removed and a closed loop is incorporated, the output signal of the phase detector 7 is supplied to a loop filter 16 to control the response of the system. A transmission function of the loop filter 16 is represented by F(s). An output signal of the loop filter 16 controls the oscillating frequency of the VCO 8. The output signal of the VCO 8 is feedbacked to the phase detector 7 to form a closed loop. Although the oscillating frequency of the VCO 8 is controlled according to the input voltage, a phase difference is detected in the phase detector 7 so that the transmission function of the VCO 8 will be 1/S. Further, assuming that the ratio of the output frequency change with respect to the input voltage change is $K_0$, the whole transmission function of the VCO 8 can be represented by $K_0/S$.

Then the change of output signal phase $\Delta_1(s)$ of the VCO 8 when the phase $\Theta_1(s)$ of the input signal, namely, the transmission function H(s) of a closed loop is obtained by the following equation:

$$H(s) = \frac{\Theta_0(s)}{\Theta_i(s)} = \frac{K_0 \cdot K_d \cdot F(s)}{S + K_0 \cdot K_d \cdot F(s)}$$

Here if the transmission function $F(s)=(S\tau_2+1)/S\tau_1$ (where $\tau_1=CR_1$ and $\tau_2=CR_2$) of a usual active filter shown in FIG. 21 is substituted for the transmission function F(s) of the loop filter 16, the transmission function H(s) of a closed loop can be expressed as follows:

$$H(s) = \frac{2 \cdot \frac{1}{2} K \frac{\tau_2}{\tau_1} S + \frac{K}{\tau_1}}{S^2 + 2 \frac{1}{2} K \frac{\tau_2}{\tau_1} S + \frac{K}{\tau_1}}$$

where $K = K_0 \cdot K_d$.
Now assuming that $$\omega_n = \left(\frac{K}{\tau_1}\right)^{1/2} \text{ and } \xi = \frac{\tau_2}{2}\left(\frac{K}{\tau_1}\right)^{1/2}$$

($\omega_n$: natual angular frequency, $\xi$: damping coefficient), the above equation will yield as follows:

$$H(s) = \frac{2\xi\omega_n S + \omega_n^2}{S^2 + 2\xi\omega_n S + \omega_n^2} \quad (1)$$

Then if the relation $S = j\omega$ is substituted for the equation (1), it yields as follows:

$$H(j\omega) = \frac{1 + j2\xi\frac{\omega}{\omega_n}}{1 - \left(\frac{\omega}{\omega_n}\right)^2 + j2\xi\frac{\omega}{\omega_n}} \quad (2)$$

FIG. 22 is a characteristic graph showing frequency responses with the y-coordinate for the absolute value |H(jω)| of H(jω), and the x-coordinate for $\omega/\omega_n$. As is apparent from FIG. 22, the frequency characteristic varies remarkably depending on the damping characteristic $\xi$. When the angular frequency $\omega$ exceeds then actual angular frequency $\omega_n$, the frequency characteristic attenuates along a curve of 6 dB/oct, thus resulting in a characteristic hardly responsive to high frequency. Even if the frequency characteristic is extended remarkably by increasing $\xi$, there would be no room for the phase of the system so that the loop will become nonstable.

Further, assuming that as a coefficient, the error of phase $\Theta_0(s)$ of the output signal of the VCO 8 with respect to the input signal phase $\Theta_1(s)$, namely, $$\frac{\Theta_1(s) - \Theta_0(s)}{\Theta_1(s)} = 1 - H(s) \quad (3)$$

is defined, the equation (3) will be $$1 - H(s) = 1 - \frac{2\xi\omega_n + S^2}{S^2 + 2\xi\omega_n S + \omega_n^2} \quad (4)$$

$$= \frac{S^2}{S^2 + 2\xi\omega_n S + \omega_n^2}$$

Further, if the relation $S = j\omega$ is substituted for the equation (4), this equation will yields as follows:

$$1 - H(j\omega) = \frac{-\left(\frac{\omega}{\omega_n}\right)^2}{1 + j2\xi\frac{\omega}{\omega_n} - \left(\frac{\omega}{\omega_n}\right)^2} \quad (5)$$

FIG. 23 is a frequency response with the y-coordinate for the absolute value |1−H(jω)| of an error coefficient and the x-coordinate for ($\omega/\omega_n$), when the value of the damping coefficient $\xi$ is 0.707 as usual. As is apparent from FIG. 23, if the angular frequency $\omega$ is about 1/10 of the natural angular frequency $\omega_n$, the error coefficient is −40 dB and hence substantial perfect responses. If $\omega$ is equal to $\omega_n$, the error also will be about −3 dB, causing a considerable error. In the usual home VTRs, since $\omega_n$ is about 1800 (rad/s), $\omega$ which can secure an error coefficient larger than −30 dB will be about 360 rad/s, i.e., about 60 Hz in frequency.

A carrier color signal is obtained by amplitude-modulating the two color-difference signals (R-Y) and (B-Y) respectively by two perpendicularly crossing carriers cos ωct and sin ωct and by adding these two resulting color-difference signals. The carrier color signal is represented by (R-Y) cosωct+(B-Y) sin ωct.

FIG. 24(a) is a vector diagram of this carrier color signal. The burst signal includes no (R-Y) component, and the phase of the burst signal is equivalent to inverted sin ωct.

With such carrier color signal, the phase of a color burst signal varies with respect to the reference signal. This means, as shown in FIG. 24(b), that the amplitude of the color-difference signals after demodulated vary according to the phase change Θ, namely, a phase change is created.

When the output frequency of the VCO is followed to the input frequency by using a PLL circuit, the response characteristic to the phase change deteriorates to increase the error, causing nonuniform color tone appearing on the TV screen.

With the foregoing conventional color signal processing circuit, the response characteristic to a quick phase change of an input signal is not sufficient and, as a result, the remaining phase error component of the color signal would be nonuniform color tone and horizontal dragging noises, thereby deteriorating the quality of the color signal.

SUMMARY OF THE INVENTION

It is therefore an object of this invention to provide a color signal processing circuit by which a sufficient response characteristic can be obtained to a quick phase change and which can minimize nonuniform color tone and horizontal dragging noises even when color signals have bad signal/ noise ratio (S/N).

According to a first aspect of the present invention, there is provided a color signal processing circuit in a color video tape recorder (hereinafter called VTR) for reproducing a color signal from a video signal in which a low-range-converted color signal is multi-plexed over a low frequency range of a frequency-modulated FM luminance signal, comprising: a phase correcting circuit composed of a phase-locked-loop (hereinafter called PLL) circuit having a closed loop for synchronizing, with a reference signal, a low-range color signal to be reproduced in a carrier frequency, the phase correcting circuit including a reference signal oscillator for generating the reference signal which is to be at least a phase reference of a color signal, a burst separator for extracting a color burst signal from the color signal which frequency is converted into a carrier frequency, and a first phase detector for detecting a phase difference between the color burst signal and the reference signal; a second phase detector for detecting a phase difference between the frequency-converted burst signal and the reference signal; a first sample hold circuit for detecting a potential of a burst signal portion of a signal outputted from the second phase detector and for holding the potential for one horizontal period; a phase modulator for phase-modulating the reference signal by a signal outputted from the first sample hold circuit; and a color signal demodulator for demodulating the signal, which is outputted from the phase modulator, into a carrier and the color signal, which is outputted from the phase correcting circuit.

With the first arrangement, this phase correcting circuit corrects relatively low frequency components of phase shifts of the input signal. The phase modulator modulates the phase of the reference signal so as to synchronize with the phase of the color burst signal output from the phase correcting circuit at high speed. The modulator demodulates the output signal of the phase correcting circuit by the output of the phase modulator and outputs a demodulated color signal in which color tone changes are corrected up to high frequency range.

According to a second aspect of the invention, there is provided a color signal processing circuit in a color VTR for reproducing a color signal from a video signal in which a low-range-converted color signal is multi-plexed over a low frequency range of a frequency-modulated FM luminance signal, comprising: a phase correcting circuit composed of a PLL circuit having a closed loop for synchronizing, with a reference signal, a low-range color signal to be reproduced as a carrier frequency, the phase correcting circuit including a reference signal oscillator for generating the reference signal which is to be at least a phase reference of a color signal, a burst separator for extracting a color burst signal from the color signal which frequency is converted into a carrier frequency, and a first phase detector for detecting a phase difference between the color burst signal and the reference signal; a second phase detector for detecting a phase difference between the frequency-converted burst signal and the reference signal; a first sample hold circuit for detecting a potential of a burst portion of a signal outputted from the second phase detector and for holding the potential for one horizontal period; a first multiplier for operating a product of a signal outputted from the first sample hold circuit and a signal outputted from the reference signal oscillator; a first phase shifter for shifting the phase of the reference signal, which is outputted from the reference signal oscillator, by −90°; a third phase detector for detecting a phase difference between the color burst signal and a signal outputted from the first phase shifter; a second sample hold circuit for detecting a potential of a burst signal portion of a signal outputted from the third phase detector and for holding the potential for one horizontal period; a second multiplier for producing a product of a signal outputted from the second sample hold circuit and a signal outputted from the first phase shifter; a mixing circuit for mixing a signal, which is outputted from the first multiplier with a signal outputted from the second multiplier; a color signal demodulator for demodulating the signal, which is outputted from the phase modulator, into a carrier and the color signal, which is outputted from the phase correcting circuit (i) a second phase shifter for shifting the phase of a signal, which is outputted from the mixing circuit, by −90°; a converter for shifting the phase of the signal, which is outputted from the mixing circuit, by 180°; and a color signal demodulator for demodulating a signal, which outputted from the second phase shifter, and a signal, which is outputted from the converter, respectively into carriers and for demodulating color signals, which are outputted from the phase correcting circuit, respectively into color signals of base bands of color-difference signals (R-Y) and (B-Y).

With the second arrangement, the phase correcting circuit corrects relatively low frequency components of phase fluctuation of the input signal, and the first and second phase detectors detect phase differences for a range of 360°, and the first and second sample hold circuits hold the potential of the burst signal portion of the detected phase difference signal for one horizontal period. By the output signals of the first and second sample hold circuits, the first and second multipliers amplitude-modulate the output of the reference signal oscillator and the output signal of the phase shifter, mix the output signal of the first multiplier with the output signal of the second multiplier, quickly synchronize the phase of the output signal of the mixing circuit with the phase of the color burst signal outputted from the phase correcting circuit, and demodulate the output signal of the phase correcting circuit by the output signal of the mixing circuit, thereby outputting a color signal of base band in which color tone non-uniformity is corrected up to a high frequency range.

According to a third aspect of the present invention, there is provided a color signal processing circuit in a color VTR for reproducing a color signal from a video signal in which a low-range-converted color signal is multi-plexed over a low frequency range of a frequency-modulated FM luminance signal, comprising: a phase correcting circuit composed of a PLL circuit having a closed loop for synchronizing, with a reference signal, a low-range color signal to be reproduced in a carrier frequency, the phase correcting circuit including a reference signal oscillator for generating the reference signal which is to be at least a phase reference of a color signal, a burst separator for extracting a color burst signal from the color signal which frequency is converted into a carrier frequency, and a first phase detector for detecting a phase difference between the color burst signal and the reference signal; a second phase detector for detecting a phase difference between the frequency-converted burst signal and the reference signal; a first sample hold circuit for detecting a potential of a burst portion of a signal outputted from the second phase detector and for holding the potential for one horizontal period; a first multiplier for operating a product of a signal outputted from the first sample hold circuit and a signal outputted from the reference signal oscillator; a first phase shifter for shifting the phase of the reference signal, which is outputted from the reference signal oscillator, by −90°; a third phase detector for detecting a phase difference between the color burst signal and a signal outputted from the first phase shifter; a second sample hold circuit for detecting a potential of a burst signal portion of a signal outputted from the third phase detector and for holding the potential for one horizontal period; a wide-band phase shifter for shifting the phase of a corrected color signal, which is outputted from the phase correcting circuit, by −90°; a second multiplier for producing a product of a signal outputted from the second sample hold circuit and a signal outputted from the wide-band phase shifter; a mixing circuit for mixing a signal from the first multiplier with a signal from the second multiplier; and an amplitude adjusting circuit for balancing the respective base bands of the color-difference signals (R-Y) and (B-Y).

With the third arrangement, this phase correcting circuit corrects relatively low frequency components of phase shifts of the input signal, the first and second phase detectors detect the phase differences for a range of 360°, and the first and second sample hold circuits hold the potential of the burst signal portion for one horizontal period. The first and second multipliers amplitude-modulate the output signal of the reference signal oscillator and the output of the phase shifter by the output of the first and second sample hold circuits.

Further, the mixing circuit mixes the output signal of the first amplifier with the output signal of the second multiplier, and the amplitude adjusting circuit adjusts the mixture ratio of the mixing circuit and also the phase of the input burst signal. The output signal of the mixing circuit is quickly synchronized with the phase of the color burst signal outputted from the phase correcting circuit. The demodulator demodulates the output signal of the phase correcting circuit by the output signal of the mixing circuit, thus outputting a color signal of base band in which color tone non-uniformity is corrected up to a high frequency range.

According to a fourth aspect of the invention, there is provided a color signal processing circuit in a color VTR for reproducing a color signal from a video signal in which a low-range-converted color signal is multi-plexed over a low frequency range of a frequency-modulated FM luminance signal, comprising: a phase correcting circuit composed of a PLL circuit having a closed loop for synchronizing, with a reference signal, a low-range color signal to be reproduced in a carrier frequency, the phase correcting circuit including a reference signal oscillator for generating the reference signal which is to be at least a phase reference of a color signal, a burst separator for extracting a color burst signal from the color signal which frequency is converted into a carrier frequency, and a first phase detector for detecting a phase difference between the color burst signal and the reference signal; a second phase detector for detecting a phase difference between the frequency-converted burst signal and the reference signal; a sample hold circuit for detecting a potential of a burst portion of a signal outputted from the second phase detector and for holding the potential for one horizontal period; and a variable delay line in which an amount of delay varies according to an amount of voltage of a signal outputted from the sample hold circuit and to which a signal from the phase correcting circuit is inputted, the variable delay line being capable of eliminating phase shifts, which could not be eliminated by the phase correcting circuit, by correcting a phase shift of the signal, which is inputted from the phase correcting circuit, depending on the change of the amount of delay.

With the fourth arrangement, the phase correcting circuit reduces relatively low frequency components of the phase shift of the input signal, and the valuable delay line eliminates the phase shifts, which could not be eliminated by the phase correcting circuit. Therefore wide-band phase correction can be achieved so that horizontal drag noises of the color signal can be restricted remarkably.

The above and other advantages, features and additional objects of this invention will be manifest to those versed in the art upon making reference to the following detailed description and the accompanying drawings in which several preferred embodiments incorporating the principles of this invention are shown by way of illustrative example.

BRIEF DESCRIPTION OF THE DRAWINGS

FIGS. 2(a) and 2(b) are graphs each showing a frequency spectrum of a color signal in the first embodiment;

FIGS. 3(a) and 3(b) are diagrams each showing a color signal vector in the first embodiment;

FIGS. 4(a), 4(b) and 4(c) are diagrams showing waveforms of the signal at various parts in the first embodiment;

FIG. 5 is a diagram showing a demodulated output after color tone correction in the first embodiment;

FIGS. 8(a), 8(b) and 8(c) are diagrams showing waveforms of the signal at various parts in the second embodiment;

DETAILED DESCRIPTION

Figure 1:
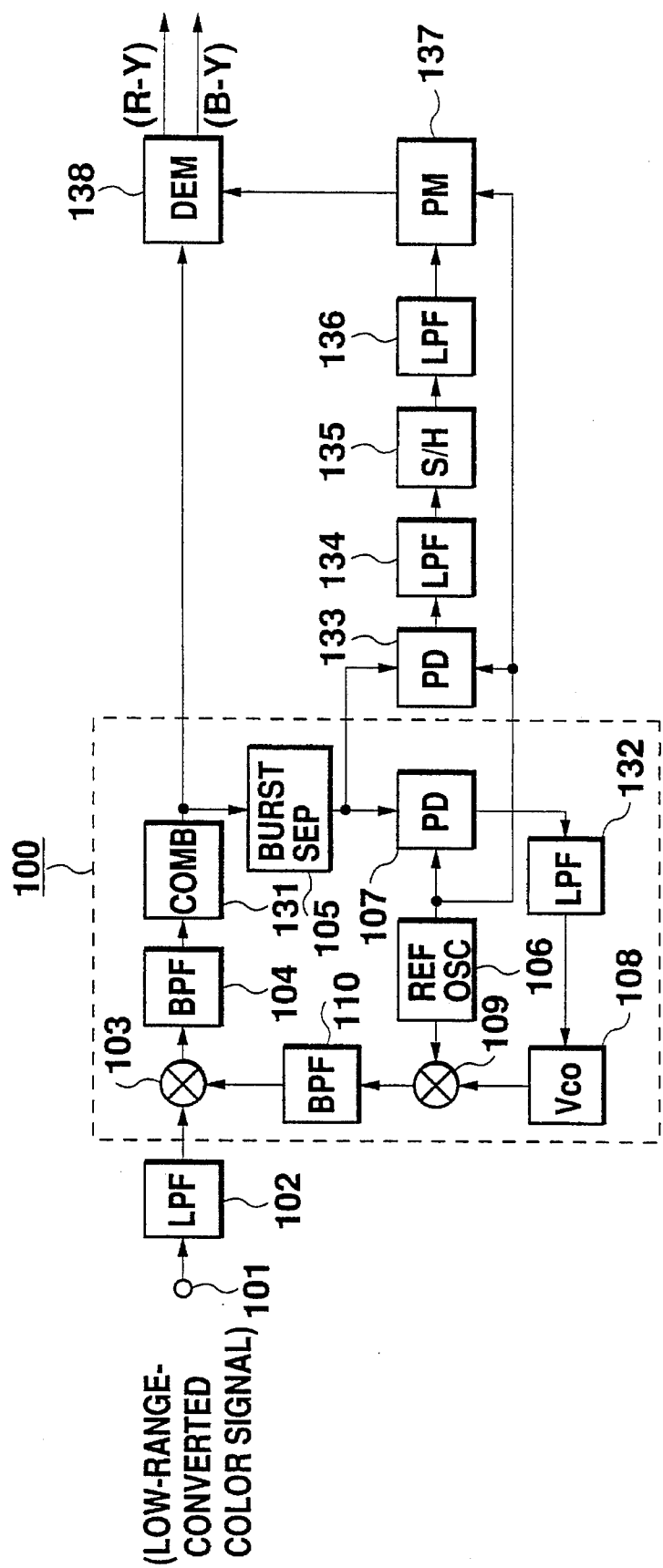
FIG. 1 is a block diagram of a color signal processing circuit according to a first embodiment of this invention.

The principles of this invention are particularly useful when embodied in a color signal processing circuit, for a home Vhs VTR system, such as shown in FIG. 1.

In FIG. 1, a low-frequency-range color signal, which is shown in FIG. 2(a) and has a carrier frequency $f_L$ including frequency shifts $+\Delta f$ created due to nonuniform feed of a magnetic tape, nonuniform rotation of a rotary drum, etc., is inputted to an input terminal 101 and is then supplied to a first low-pass filter 102.

The first low-pass filter 101 removes unnecessary components other than the low-frequency-range color signal. An output signal of the first low-pass filter 102 is supplied to a first frequency converter 103 and is thereby converted into a color signal having an original carrier frequency $f_{SC}$. For example, in the NTSC method, a frequency of 3.58 MHz is selected. Since in the first frequency converter 103, many unneccessary high-frequency components as well as necessary signals are created, the first band-pass filter 104 removes the unnecessary components. The frequency spectrum of the output signal of the first band-pass filter 104 is shown in FIG. 2(b).

Then the output signal of the first band-pass filter 104 is supplied to a comb-shaped filter (COMB) 131. The purpose of the comb-shaped filter 131 is to remove crosstalks from adjacent recording tracks on a magnetic tape. In general, a home VTR has a gap between adjacent recording tracks in order to use a magnetic tape with increased efficiency and hence has the recording.reproducing mode devoid of a guard band. For example, because recording and reproducing are performed by using a magnetic head of a head width of about 25 to 30 μm, compared to a track width of 19 μm, like the long-time mode of VHS method, there is no guard band. Therefore, in a home VTR, a color signal carrier frequency of adjacent track is interleaved with an offset of ½ $f_H$ ($f_H$: horizontal frequency). Consequently, by passing the signal through the comb-shaped filter 131, it is possible to remove crosstalk from adjacent tracks efficiently. If a color signal includes no crosstalk from adjacent track, the comb-shaped filter 131 may be omitted.

Subsequently, the output signal of the comb-shaped filter 131 is supplied to a burst separator 105 where only a color burst signal portion of the color signal is extracted. The output signal of the burst separator 105, together with the output signal of a reference signal oscillator 106 which generates a reference signal $f_{SC}$ of 3.58 MHz, is supplied to a first phase detector 107 where a phase difference between these two signals is detected.

Then, the output signal of the first phase detector 107, namely, a phase error signal controls the output signal of a VCO 108, with high frequency components being removed by a loop filter (LPF) 132, in such manner that a frequency $f_L \pm \Delta f$ like the low-frequency-range color signal inputted to the input terminal 101. The output of the VCO 108, together with the output of the reference signal oscillator 106, is supplied to a second frequency converter 109 where a product of these two signals is operated. Thereby the output signal of the second frequency converter 109 includes frequency components $f_{SC}+f_L\pm\Delta f$ and $f_{SC}-f_L\pm\Delta f$; only the component $f_{SC}+f_L\pm\Delta f$ is extracted by a second band-pass filter 110.

The output signal of the second band-pass filter 110 is supplied to the first frequency converter 103 as a carrier. The output signal of the frequency converter 103 has frequency components $f_{SC}$ AND $f_{SC}+2(f_L+\Delta f)$, and only the component $f_{SC}$ is extracted.

The first frequency converter 103, the first band-pass filter 104, the comb-shaped filter 131, the burst separator 105, the first phase detector 107, the loop filter 132, the VCO 108, the reference signal oscillator 106, the second frequency converter 109 and the second band-pass filter 110 jointly constitute a phase correcting circuit 100. Thus a closed loop is provided so as to normally synchronize the phase of a color burst signal, which is the output signal of the burst separator 105, with the phase of the output signal of the reference signal oscillator 106. With this closed loop arrangement, relatively low frequency components of phase shifts of the input signal inputted to the input terminal 101 are corrected.

Thereafter, the output signal of the burst separator 105 is supplied to a second phase detector (PD) 133 and is thereby compared in phase with the output signal of the reference signal oscillator 106.

The output of the phase correcting circuit 100 is stable for a phase shift of low frequency and varies, with respect to the reference signal, for a phase shift of high frequency component, as shown in FIG. 3(a).

The second phase detector 133 detects a phase shift e with respect to the reference signal. The output signal of the second phase detector 133 includes many unnecessary high-frequency components, and the high frequency components are removed by a second low-pass filter (LPF) 134. In the output signal of the second low-pass filter 134, as shown in FIG. 4(a), a voltage corresponding to the amount of phase shift is obtained at the position of a color burst signal at the intervals of one horizontal period (1H).

The output signal of the second low-pass filter is supplied to a sample hold circuit (S/H) 135 where the potential of the color burst signal portion is detected and is held for one horizontal period (1H). The waveform of the output signal of the sample hold circuit 135 is shown in FIG. 4(b). The output signal of the sample hold circuit 135 includes unnecessary high-frequency components, and the unnecessary high-frequency components are removed as the signal passes through a third low-pass filter 136. The waveform of the output signal of the third low-pass filter 136 is shown in FIG. 4(c).

Then, the output signal of the reference signal oscillator 106 is supplied to a phase modulator (PM) 137 where the phase of the reference signal is modulated by the output signal of the third low-pass filter 136. For example, as shown in FIG. 3(b), in the case the phase of a reproducing burst signal has a phase error of Θ with respect to the reference phase, the reference phase is turned by Θ by the phase modulator 137 to provide a new orthogonal coordinate system with the output signal of the phase modulator 137 being a reference. It is thus possible to remove a relative phase shift of the color burst phase with respect to the output signal phase of the phase modulator 137.

Subsequently, the output signal of the phase correcting circuit 100 is supplied to a color signal demodulator (DEM) 138 where the output signal of the phase modulator 137 is demodulated as a carrier to provide color-difference signals (R-Y) and (B-Y). Here the output signal of the phase modulator 137 is represented as a virtual signal by a vector diagram of FIG. 5, which shows that the phase shift Θ has no effect on the demodulated output.

The phase of output burst signal of the phase correcting circuit 100 is compared with the phase of output signal of the reference signal oscillator 106. Since no feedback loop is included in the process of modulating the phase of the reference signal according to the phase difference, it is possible to respond at high speed so that the remaining phase shift components of high frequency included in the output signal of the phase correcting circuit 100 can be removed with efficiency.

Further, since an actual shift is restricted to about ±10° by the phase correcting circuit 100, it is unnecessary to take a wide dynamic range of the phase modulator 137 so that a very stable operation can be achieved.

In this embodiment, the first and second phase detectors 107, 133 are provided independently of each other. Alternatively, one of these two detectors may be used commonly.

Further, in this embodiment, the sample hold circuit 135 is a zero hold circuit for holding the detected potential with no change. In an alternative form, a primary hold circuit such that the detected potentials will be located on a straight line may be used, and the number of degrees should by no means be limited.

Since the third low-pass filter 136 depends on the signal/noise ratio (S/N), this filter may be omitted in the presence of good signal/noise ratio.

Still further, in this embodiment, the demodulated color-difference signal is directly used as the output signal. However, the demodulated color-difference signal may be converted again into a carrier color signal by the output signal of the reference signal oscillator 106, and the form of output signal should by no means be limited.

As described above, according to this embodiment, since a carrier color signal, whose high-frequency phase shift components are reduced by the closed loop phase correcting system such that the phase of color burst signal of a color signal is synchronized with the reference signal, is demodulated by a signal in which the phase of the reference signal is modulated by the remaining phase error components at high speed, stable wide-band color correction can be achieved. Thus it is possible to obtain a color signal processing circuit by which the nonuniform color tone of a color signal can be reduced to considerably.

Figure 6:
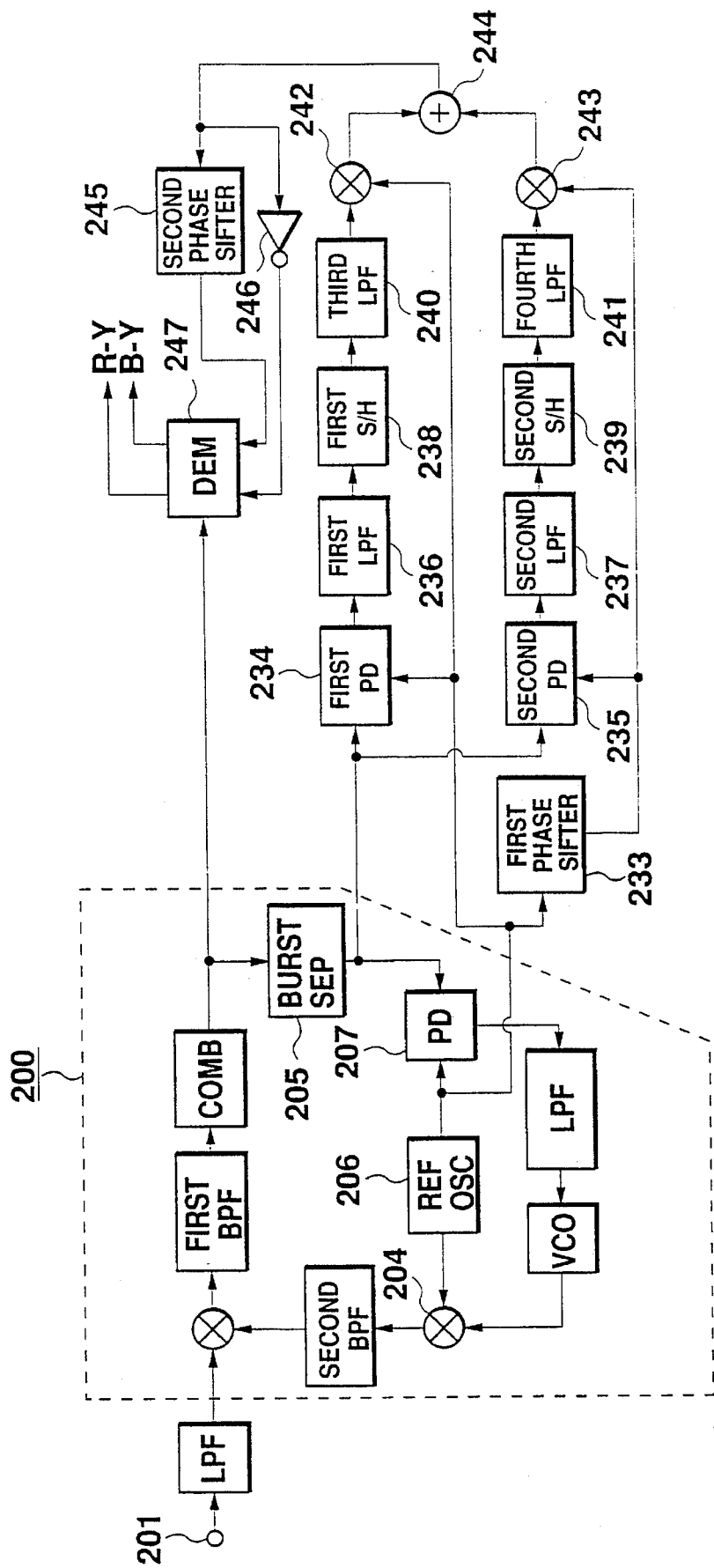
FIG. 6 is a block diagram showing a signal processing circuit according to a second embodiment.

FIG. 6 shows a color signal processing circuit, in a color VTR, according to a second embodiment.

In FIG. 6, a PLL circuit 200 is similar, in both construction and function, to the PLL circuit 100 of FIG. 1 and corrects relatively low frequency components of a color signal inputted to an input terminal 201.

Reference numeral 234 designates a first phase detector (PD) which detects a phase difference between a burst signal of the output signal of the PLL circuit 200; 233, a first phase shifter which shifts the phase of the output signal of the reference signal oscillator (REF OSC) 206 by −90°; 235, a second phase detector which detects a phase difference between a burst signal of the output signal of the PLL circuit 200 and the output signal of the first phase shifter 233; and 236, 237, first and second low-pass filters which remove unnecessary frequency components of the respective output signals of the first and second phase detectors 234, 235.

238, 239 designate first and second sample hold circuit (S/H) to which the respective output signal of the first and second low-pass filters 236, 237 and which detect and hold the potentials of the respective burst signal portions; 240, 241, third and fourth low-pass filters; 242, a first multiplier which produces a product of an output signal of the first sample hold circuit 238 outputted through the third low-pass filter 240 and an output signal of the reference signal oscillator 206, both signals being outputted through the third low-pass filter 240; and 243, a second multiplier which produces a product of an output signal of the second sample hold circuit 239 and an output signal of the first phase shifter 233, both signals being outputted through the fourth low-pass filter 241.

244 designates a mixing circuit which mixes the output signal of the first multiplier 242 with the output signal of the second multiplier 243; 245, a second phase shifter which shifts the phase of the output signal of the mixing circuit 244 by −90°; 246, an inverter circuit which inverts the phase of the output signal of the mixing circuit 244; and 241, a color signal demodulator circuit (DEM) to which the output signal of the PLL circuit 200 and which demodulates the output signal of the PLL circuit 200 into color-difference signals, namely, color signals (R-Y) and (B-Y) of base band, with the output signals of the second phase shifter 245 and the inverter circuit 246 being as carriers.

The operation of the color signal processing circuit will now be described.

A low-frequency-range color signal $f_L$ including a frequency change $\pm\Delta f$ is inputted to the input terminal 201. The PLL circuit operations 200 operates until relatively low frequency components of the phase shifts are corrected in the manner discussed above in connection with the description of the prior art. Therefore their detailed description except the correcting operation for quick phase change is omitted here for clarity.

First the output signal of the reference signal oscillator 206 is supplied to the first phase shifter 233 and is thereby shifted in phase by −90°. Here assuming that the output signal of the reference signal oscillator 206 is represented by cos $\omega_{SC_t}$, the output signal of the first phase shifter 233 will be sin $\omega SC_t$ ($\omega_{SC}=2\cdot\pi\cdot f_{sc}$, $f_{sc}$: carrier color signal frequency).

Figure 7A:
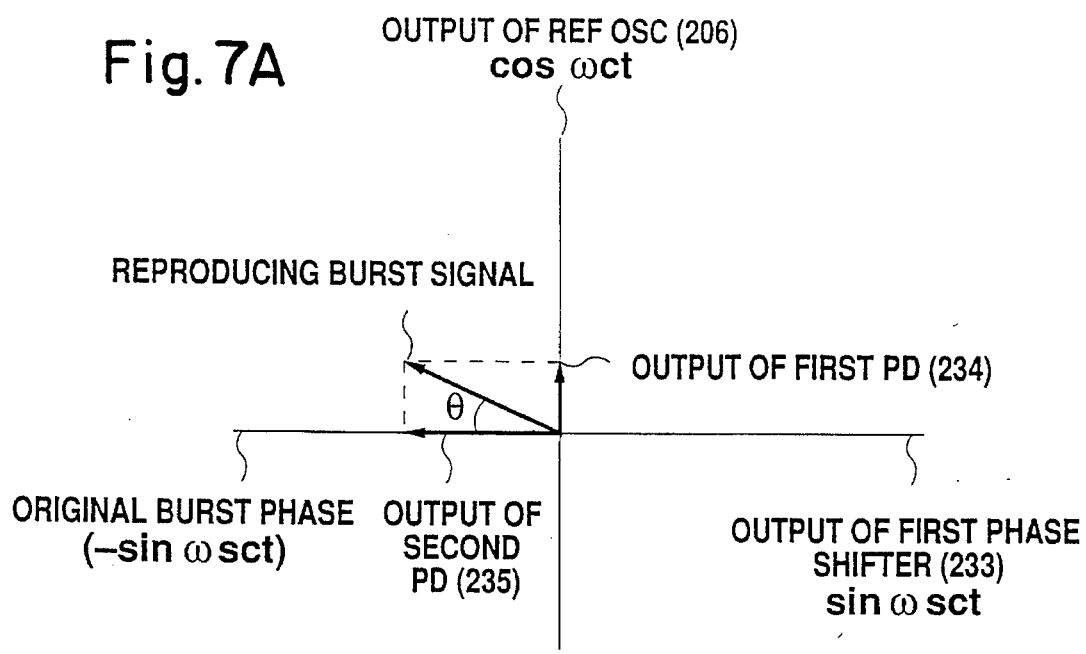
FIGS. 7(a) and 7(b) are diagrams each showing a phase relation of reproducing burst and color signals with respect to a reference signal in the second embodiment.
Figure 7B:
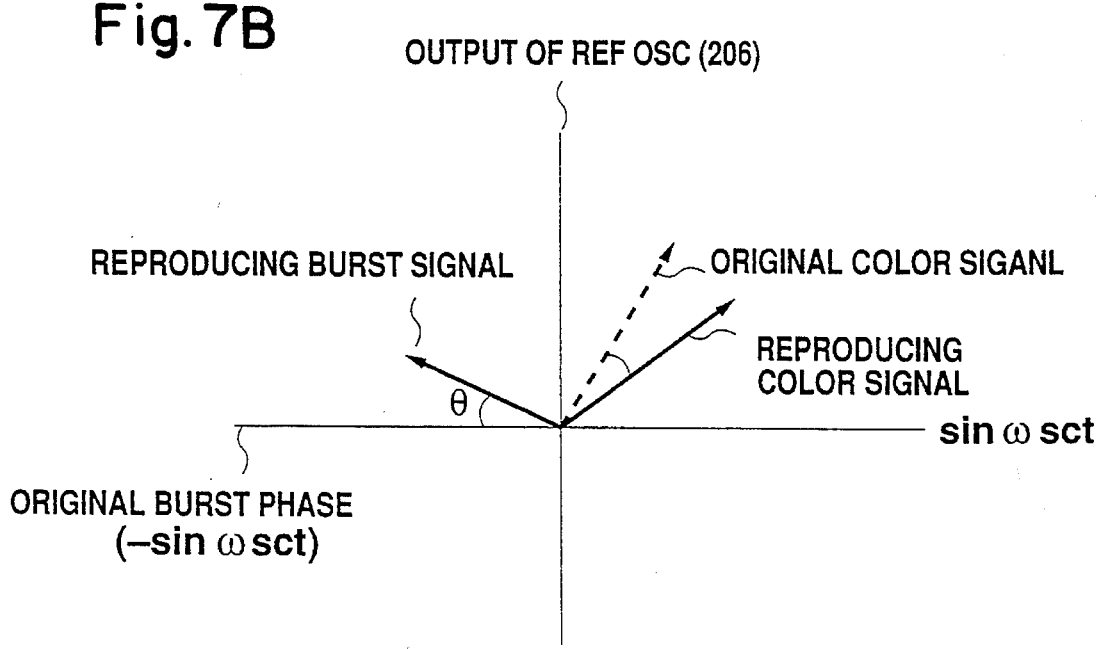

FIG. 7(a) shows an orthogonal coordinate system in terms of phase of the output signal of the reference signal oscillator 206. If the original burst phase is −sin $\omega_{SC_t}$, as shown in FIG. 7(b), the phase of burst signal of the output signal of the burst separator 205 includes the remaining phase error Θ. Likewise, a reproducing color signal also includes a phase error Θ with respect to the phase of the original color signal. Though Θ actually varies with time, it is fixed here for clarity.

The output signal of the burst separator 205 is supplied to the first and second phase detectors 234, 235 in parallel. The output signal of the reference signal oscillator 206 is supplied to the first phase detector 234 where a phase difference of these two signals is detected. And the output signal of the first phase shifter is supplied to the second phase detector 235 where a phase difference of these two signals is detected. Thus, as shown in FIG. 7(a), the output signal of the first phase detector 234 detects cos $\omega_{SC_t}$ axis component of the reproducing burst signal, and the output signal of the second phase detector 235 detects sin $\omega_{SC_t}$ axis component of the reproducing burst signal.

Thus by obtaining cos $\omega_{SC_t}$ axis component and sin $\omega_{SC_t}$ axis component on the orthogonal coordinate system with the output signal of the reference signal oscillator 206 being a reference signal, it is possible to define the phase of a reproducing burst signal within a range of 360°.

Then the output signals of the first and second phase detectors 234, 235 are supplied to the first and second low-pass filters 236, 237, respectively, where unnecessary frequency components are removed. A color burst signal, as shown in FIG. 8(a), exists only a period of about 3 μs of one horizontal period (63.5 μm in NTSC method). Therefore, the output signal of the first low-pass filter 236 is supplied to the first sample hold circuit 238, and likewise, the output signal of the second low-pass filter 237 is supplied to the second sample hold circuit 239. The first and second sample hold circuits 238, 239 hold the potentials of burst signal portions of the respective output signals of the first and second low-pass filters 236, 237 of FIG. 8(b) for one horizontal period, as shown in FIG. 8(c).

Because the respective output signals of the first and second sample hold circuits 238, 239 include unnecessary frequency components such as switching noise, the output signal of the first sample hold circuit 238 is supplied to the third low-pass filter 240, and likewise the output signal of the second sample hold circuit 239 is supplied to the fourth low-pass filter 241. In the third and fourth low-pass filters 240, 241, the respective unnecessary frequency components of these two supplied signals are removed.

Figure 9A:
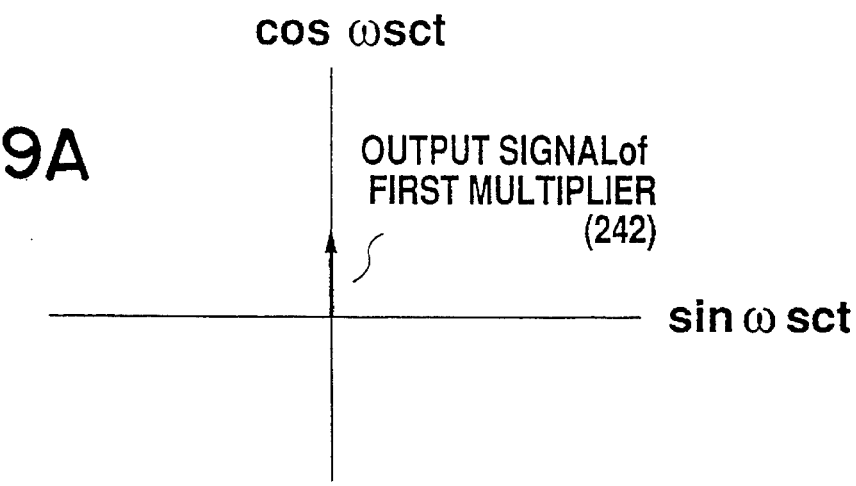
FIGS. 9(a), 9(b) and 9(c) are diagrams showing phase modulating operation in the second embodiment.

Subsequently, the output signal of the reference signal oscillator 206, together with the output signal of the third low-pass filter 240, is inputted to the first multiplier 242 where a product of these two signals is produced. As a result, a signal such as shown in FIG. 9(a) is obtained.

Figure 9B:
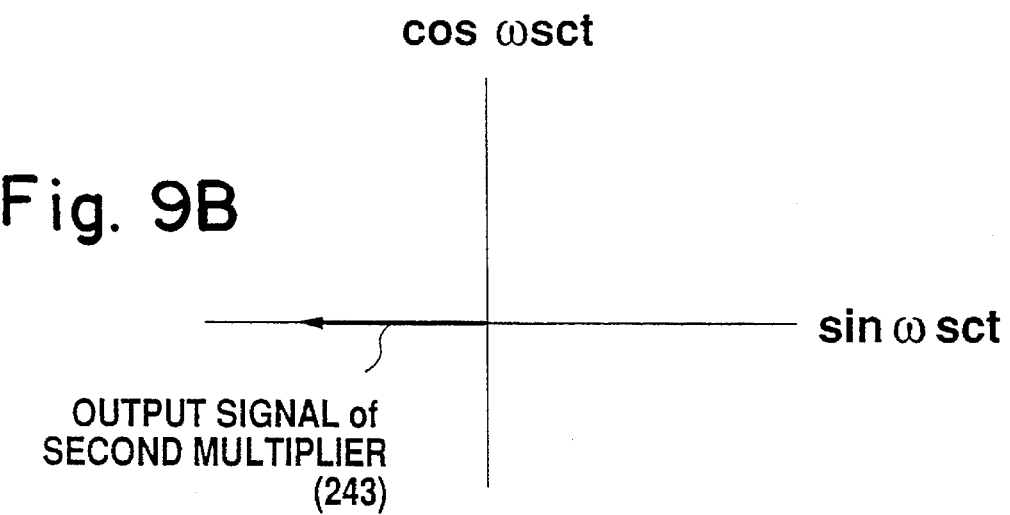

Further, the output signal of the first phase shifter 233, together with the output signal of the fourth low-pass filter 241, is inputted to the second multiplier 243 where a product of these two signals is produced. As a result, a signal such as shown in FIG. 9(b) is obtained.

Figure 9C:
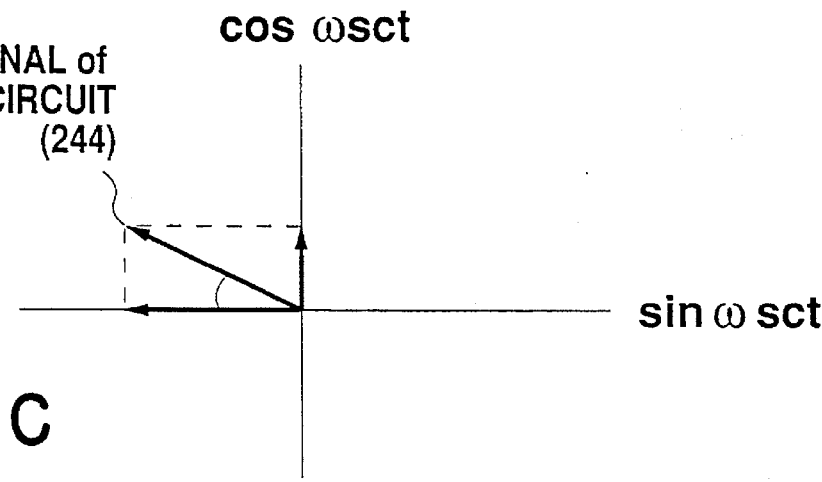

Then, the output signals of the first and second multipliers 242, 243 are inputted to the mixing circuit 244 where these two signals are mixed up. As the output signal of the mixing circuit 244, a signal having a phase and amplitude, such as shown in FIG. 9(c) is obtained. Here the phase of the output signal of the mixing circuit 244 is synchronous with the phase of a color burst signal of the output signal of the burst separator 205 and is a continuous signal but not an intermittent signal such as a burst signal.

Figure 10A:
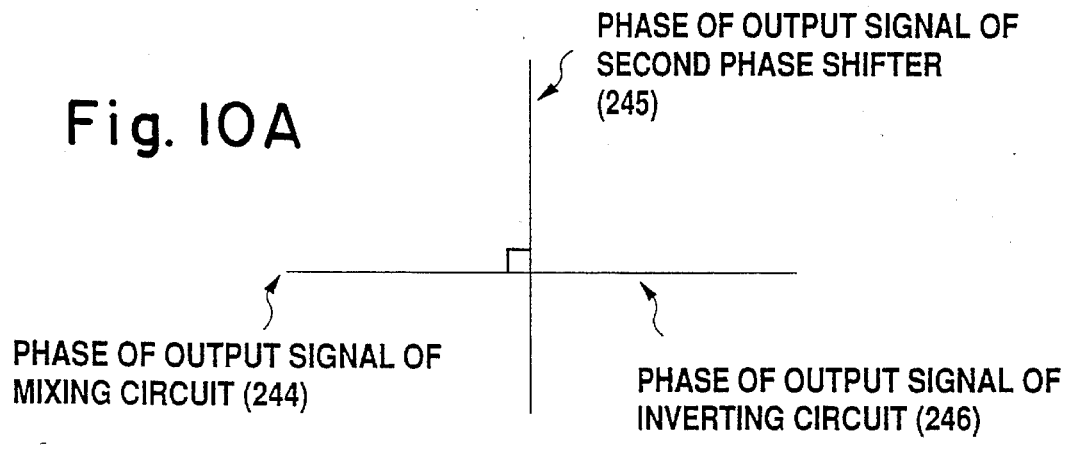
FIGS. 10(a) and 10(b) are diagrams each showing a phase relation of reproducing color and burst signals with respect to a phase-modulated reference signal.
Figure 10B:
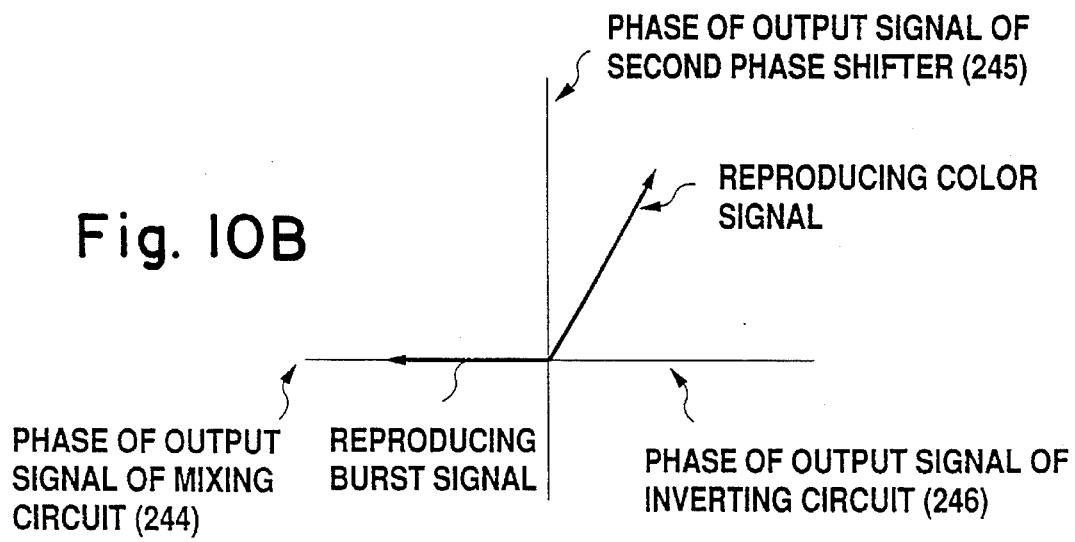

Next, the output signal of the mixing circuit 244 is supplied to the second phase shifter 245 and is thereby shifted in phase by −90°. The output signal of the mixing circuit 244 is supplied to the inverter circuit 246 and is thereby inverted in phase. Here the output signal of the inverter circuit 246 and the output signal of the second phase shifter 245 jointly constitute a new orthogonal coordinate system, as shown in FIG. 10(a). Assuming that a reproducing burst signal is shown on the new orthogonal coordinate system, as shown in FIG. 10(b), the phase of this reproducing burst signal coincides with the phase of the output signal of the mixing circuit 244. Namely, since a relative phase shift of the reproducing burst signal and the output signal of the mixing circuit 244 is removed, the phase of a burst signal is fixed on the new orthogonal coordinate system.

Then the output signal of the PLL circuit is supplied to the demodulator 247 where the output signal of the inverter circuit 246 and the output signal of the second phase shifter 245 are demodulated, as demodulated carriers, into color-difference signals, i.e., color signals of base band (R-Y) and (B-Y). Here assuming that the output signal of the mixing circuit 244 is represented by a vector diagram in terms of a virtual reference signal, the phase shift Θ has no effect on the demodulated output, as shown in FIG. 10(b).

Further, the phase of the output burst signal of the PLL circuit 200 is compared with the phase of the output signal of the reference signal oscillator 206. Since no feedback loop is included when modulating the phase of the reference signal according to such phase difference, it is possible to respond at high speed so that relatively high frequency remaining phase shift components included in the output signal of the PLL circuit 200 can be removed with efficiency. Further, since detecting and correcting phase can be performed for the wide range of 360°, it is possible to correct even a great amount of phase shift such as of head switching point of a VTR.

In this embodiment, the phase detector 207 and the first phase detector 234 are provided independently of each other. Alternatively, only one phase detector may be provided for common use.

Further, in this embodiment, for each of the first and second sample hold circuits 238, 239, a zero hold circuit for holds the detected potential without change. However, a primary hold circuit such that detected potentials are distributed on a straight line may be used; the number of degrees should by no means be limited to a specific example.

Still further, if the level of noise is small, both the third and fourth low-pass filters 240, 241 may be omitted.

In addition, in this embodiment, the demodulated color-difference signal is outputted directly. The demodulated color-difference signal may be converted again into a carrier color signal such as by the output signal of the reference oscillator 206; the form of output signal should by no means be limited.

As described above, according to the second embodiment, partly since a phase difference between a color burst signal and a reference signal is detected for the range of 360° in a carrier color signal in which low frequency phase shift components are reduced by a closed loop phase correcting system such that the phase of the color burst signal of a color signal coincides with the phase of the reference signal, and partly since the carrier color signal is demodulated by a signal resulting from the reference signal that is phase-modulated at high speed by the remaining phase error components, it is possible to perform a color tone correction stably through a wide band so that nonuniform color tone of a color signal can be reduced considerably.

Figure 11:
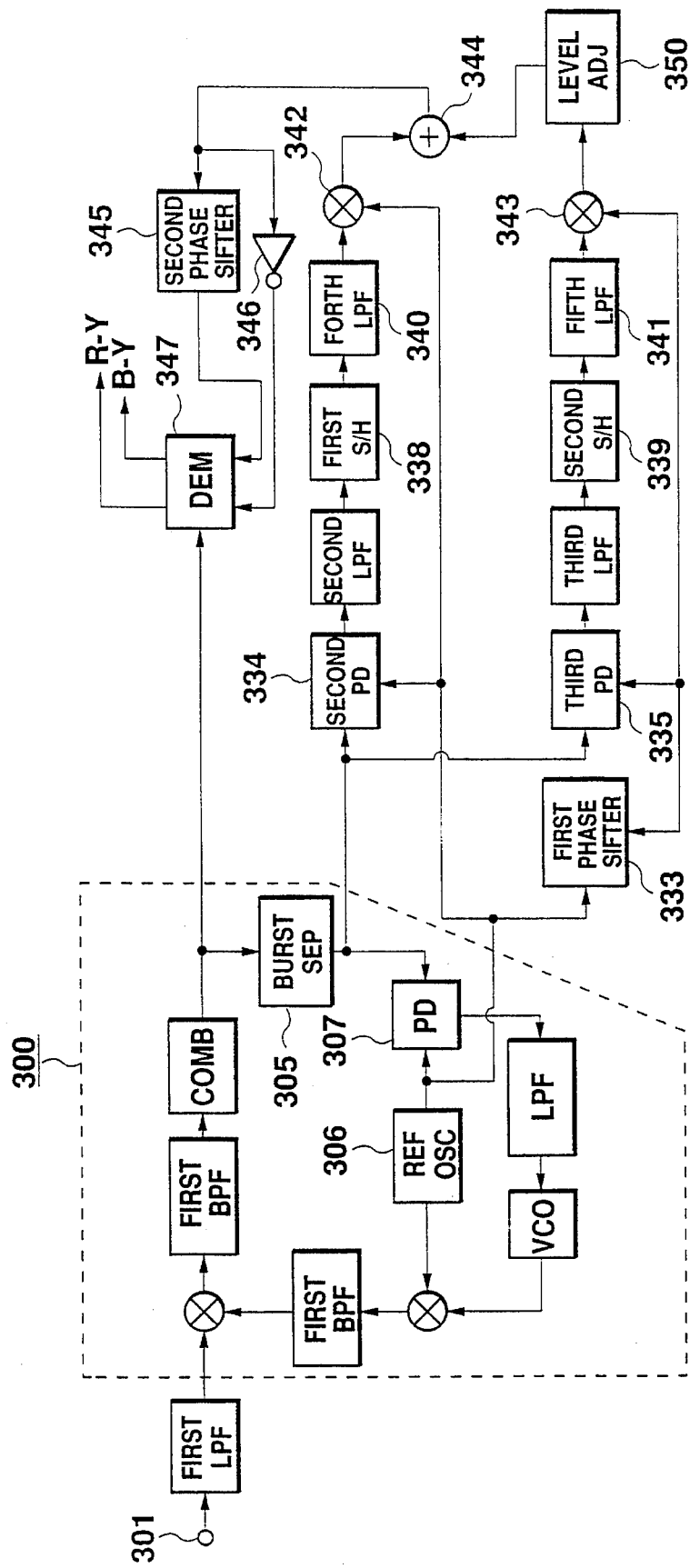
FIG. 11 is a block diagram showing a color signal processing circuit according to a third embodiment.

FIG. 11 shows a color signal processing circuit, in a home color VTR of the VHS method, according to a third embodiment. The color signal processing circuit of the third embodiment is similar in construction to the color signal processing circuit of FIG. 6, except that it includes an amplitude adjusting circuit (hereinafter called LEVEL ADJ) 350.

Therefore, description for the same construction, operation and result as those of the second embodiment is omitted here for clarity.

Figure 12A:
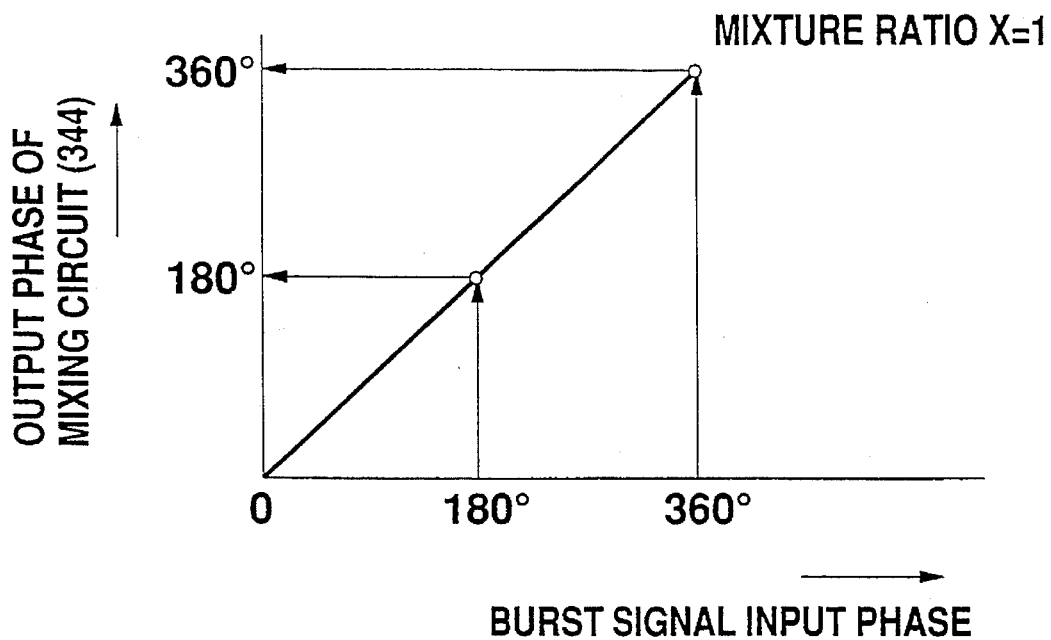
FIGS. 12(a) and 12(b) are diagrams each showing a phase relation of reproducing color and burst signals with respect to a phase-modulated reference signal in the third embodiment.

The output signal of the second multiplier 343 is supplied to the LEVEL ADJ 350 and is thereby amplitude-adjusted, whereupon the output signal of the second multiplier 343, together with the output of the first multiplier 342, is inputted to the mixing circuit 344. Here assuming that the mixture ratio (X) in the mixing circuit 344 is 1 (one), the phase of the output signal of the mixing circuit 344 with respect to the phase of the input burst signal is distributed on a straight line as plotted on a graph as shown in FIG. 12 (a).

Thus, the phase of the output signal of the mixing circuit 344 is perfectly synchronous with the phase of color burst signal of the output signal of the burst separator 305 and is a continuous signal not an intermittent signal such as a burst signal.

Figure 13A:
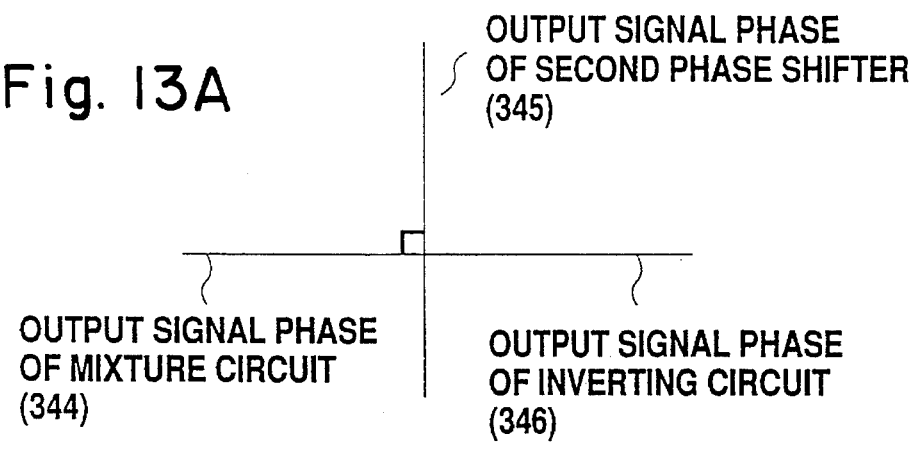
FIGS. 13(a), 13(b) and 13(c) are diagrams showing the output phase characteristic of an input burst phase mixing circuit in the third embodiment.
Figure 13B:
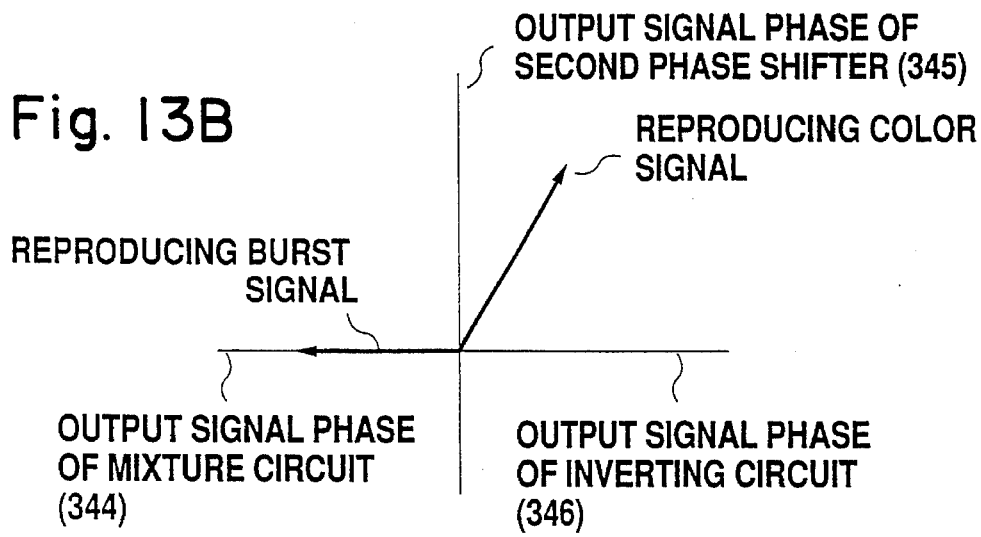

Subsequently, the output signal of the mixing circuit 344 is supplied to the second phase shifter 345 and is thereby shifted in phase by −90°. And the output signal of the mixing circuit 344 is supplied to the inverter circuit 346 and is thereby inverted in phase. Here the output signal of the inverter circuit 346 and the output signal of the second phase shifter 345 jointly constitute a new orthogonal coordinate system, as shown in FIG. 13(a). Further, assuming that a reproducing burst signal is indicated on the new orthogonal coordinate system, the phase of the reproducing burst signal coincides with the phase of the output signal of the mixing circuit 344, as shown in FIG. 13(b). Namely, since a relative phase shift between the phase of the reproducing burst signal and the phase of the output signal of the mixing circuit 344 is removed, the phase of the burst signal is fixed on the new orthogonal coordinate system.

Figure 13C:
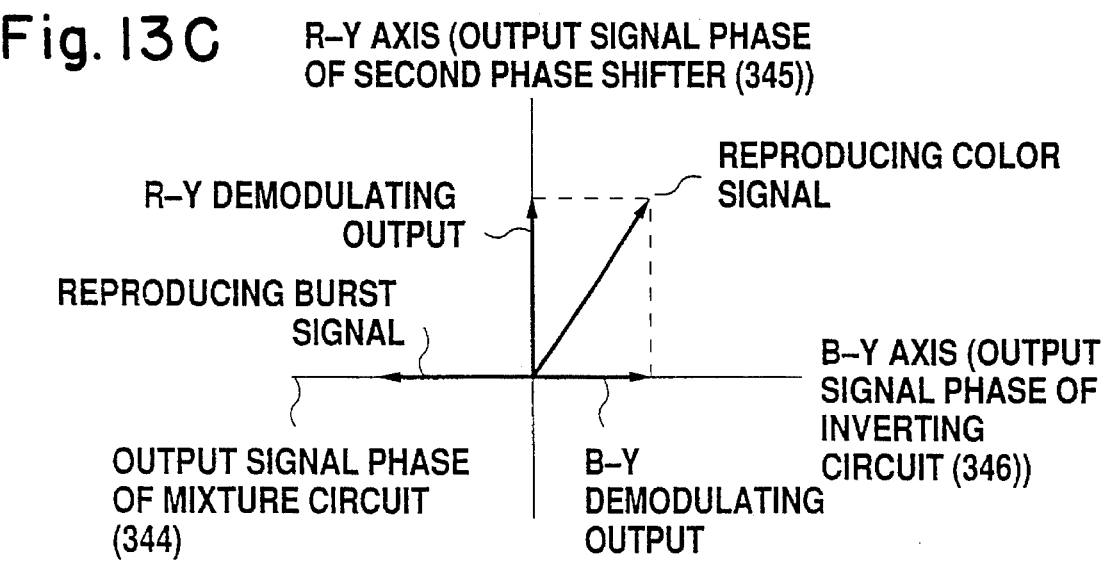

Then, the output signal of a phase correcting circuit 300 is supplied to a demodulator (DEM) 347 where the output signal of the inverter circuit 346 and the output signal of the second phase shifter 345 are demodulated, as carriers, into color-difference signals, i.e. base-band color signals (R-Y) and (B-Y). Here assuming that the output signal of the mixing circuit 344 is represented by a vector diagram in terms of a virtual reference signal, the phase shift Θ has no effect on demodulated output, as shown in FIG. 13(c).

The foregoing processing procedures are suitable to the case that the signal/noise ratio of the input burst signal is relatively good, but will cause nonuniform color tone to deteriorate when the signal/noise ratio is not good. The reason for this is that the degree of precision of detecting the phase in each of the phase detectors 307, 334, 335 would become worse as the frequency increases.

Figure 14A:
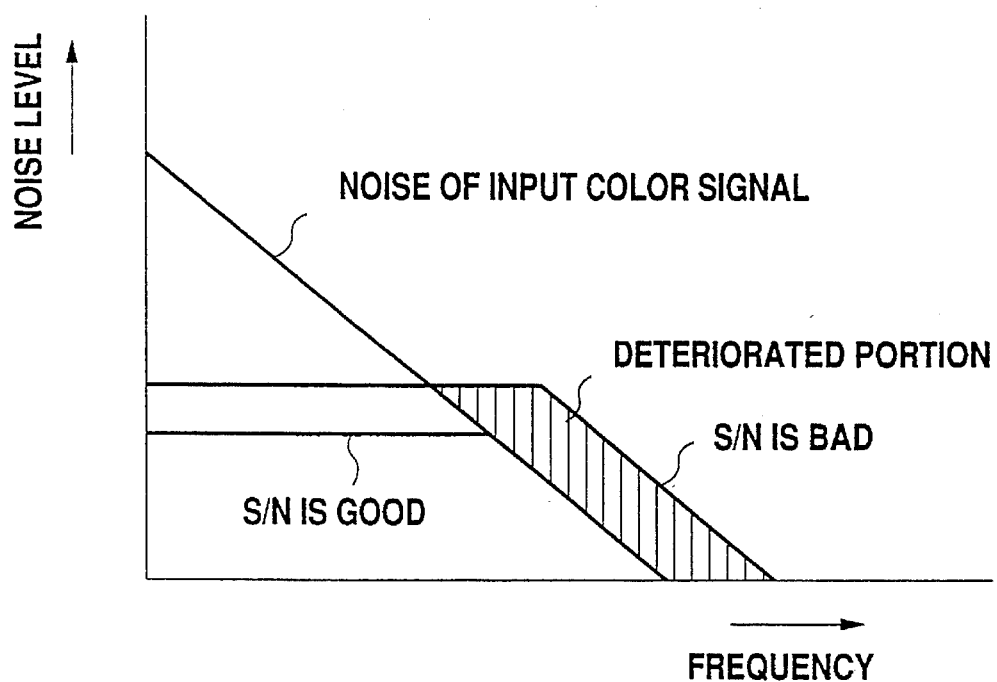
FIGS. 14(a) and 14(b) are graphs showing noise distribution of a color signal in the third embodiment.

Therefore, as shown in FIG. 14(a), regarding noise of the input color signal, it is improved for low frequency range and will become worse for high frequency range. As a method of preventing deterioration of the characteristic in high frequency range, it could be considered that the cut-off frequencies of the first and third low-pass filters be set to low. However, setting the cut-off frequencies to too low, the amount of delay in each filter so that the output signal, i.e. control signal, of the mixing circuit 344 will be out of phase coincidence with the input signal to the demodulator 347, thus reducing the effect of restriction of the phase shift.

Figure 12B:
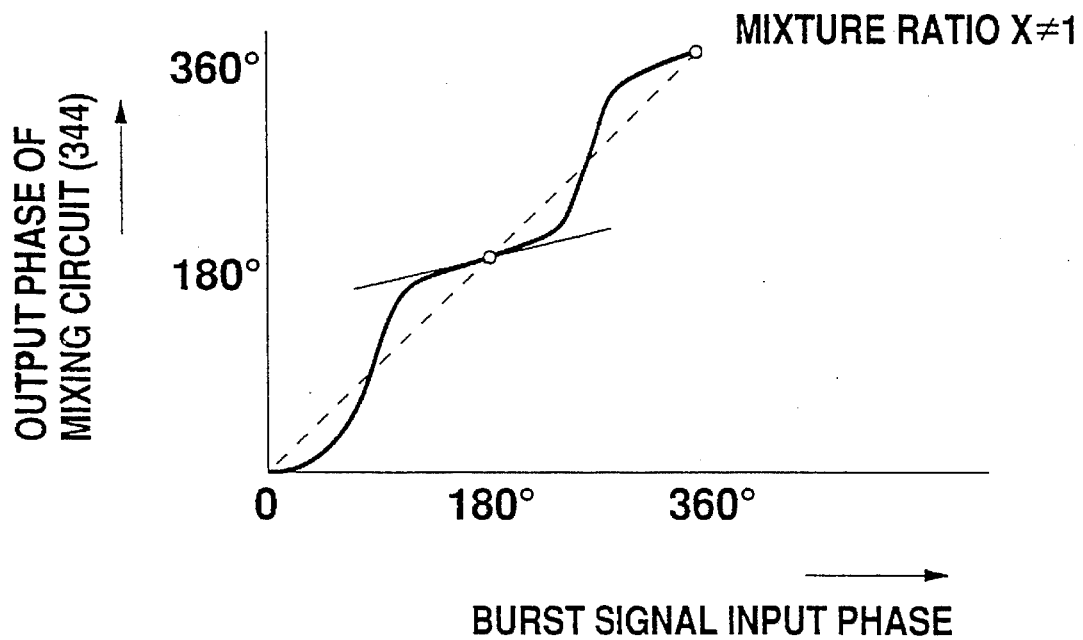

Consequently, there is a lower limit of the cut-off frequency to be set. To this end, as shown in FIG. 12(b), assuming that the mixture ratio (X) in the mixing circuit 344 is adjusted by the LEVEL ADJ 350 so as to be X≠1, the phase of the output signal of the mixing circuit 344 would not become straight, creating wave. Here, if for example, the input phase of the burst signal is 180°, the output phase of the mixing circuit 344 also will be 180°. But if the input burst phase shifts from 180°, the output phase of the mixing circuit 344 will vary more gently than the input phase of the burst signal, thus reducing conversion sensitivity.

Figure 14B:
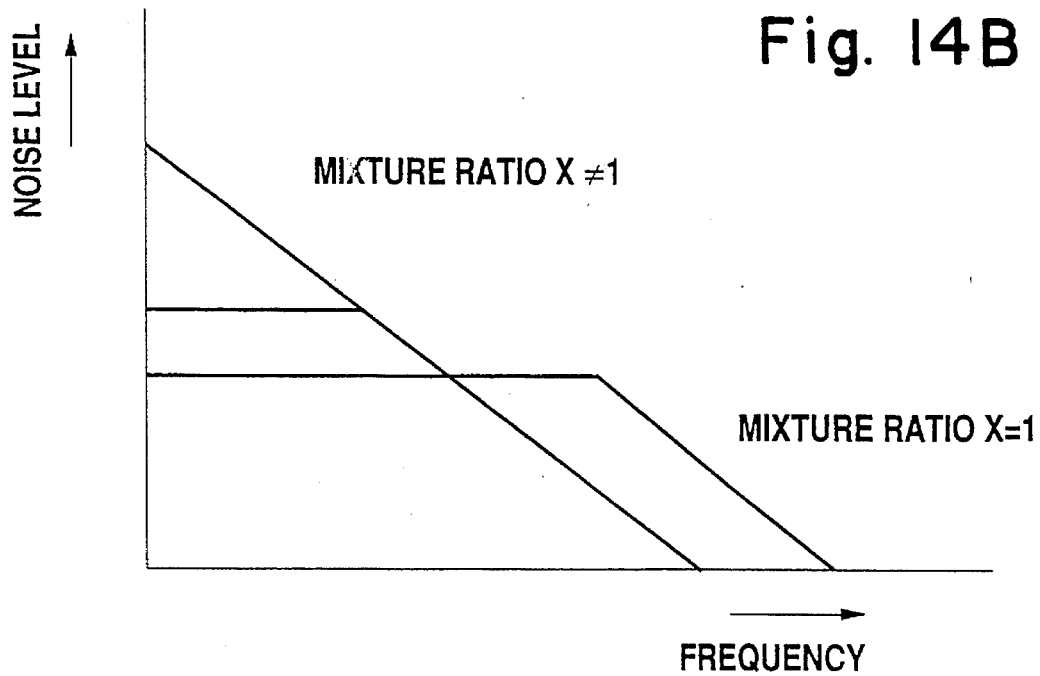

If the conversion sensitivity is reduced, as shown in FIG. 14(b), the improving effect will be reduced for low frequency range, but will not cause nonuniform color tone to become worse for high frequency range. Therefore, even when the signal/noise ratio of the input color signal is not good, improvement to nonuniform color tone is possible. When the signal/noise ratio is good, it should be adjusted so as to be X=1.

Further, partly since the phase of the output burst signal of the phase correcting circuit 300 is compared with the phase of the output signal of the reference signal oscillator 306, and partly since no feedback loop is included in the procedure to modulate the phase of the reference signal according to such phase difference, it is possible to respond at high speed so that remaining phase shift components of relatively high frequency included in the output signal of the phase correcting circuit 300 can be removed with efficiency. According to this method, since detecting and correcting a phase shift can be performed for a wide range of 360°, phase correction can be possible even for a large phase shift such as of the head switching point of a VTR.

In this embodiment, the first and second phase detectors 307, 334 are provided independently of each other. Alternatively, one of these two phase detectors may be for common use.

Also in this embodiment, each of the first and second sample hold circuit 338, 339 is a zero hold circuit which holds the detected potential with not change. In an alternative form, a primary hold circuit such that the detected potential is distributed on a straight line; the number of degrees should by no means be limited to a specific example.

If the level of noise is low, the fourth and fifth low-pass filters 340, 341 may be omitted.

In this embodiment, the LEVEL ADJ 350 is connected to the output of the second multiplier 343. However, it may be otherwise connected to whatever part, for example, to the output of the first multiplier 342.

In addition, in this embodiment, the demodulated color-difference signal is outputted directly. Alternatively, the demodulated color-difference signal may be converted into a carrier color signal again such as by the output signal of the reference signal oscillator 306; the form of the output signal should by no means be limited.

As described above, according to the third embodiment, partly since a phase difference between a color burst signal and a reference signal in a carrier color signal, in which phase shift components of low frequency by a closed loop phase correcting system such that the phase of the color burst signal of a color signal coincides with the phase of the reference signal, is detected for the range of 360°, and partly since the carrier color signal is demodulated by a signal resulting from the reference signal that is phase-modulated at high speed by the remaining phase error components, it is possible to achieve color tone correction stably through a wide band. Further, the phase conversion sensitivity of the demodulated carrier can be adjusted, it is possible to reduce non-uniform color tone considerably even of a color signal in which the signal/noise ratio is not good.

Figure 15:
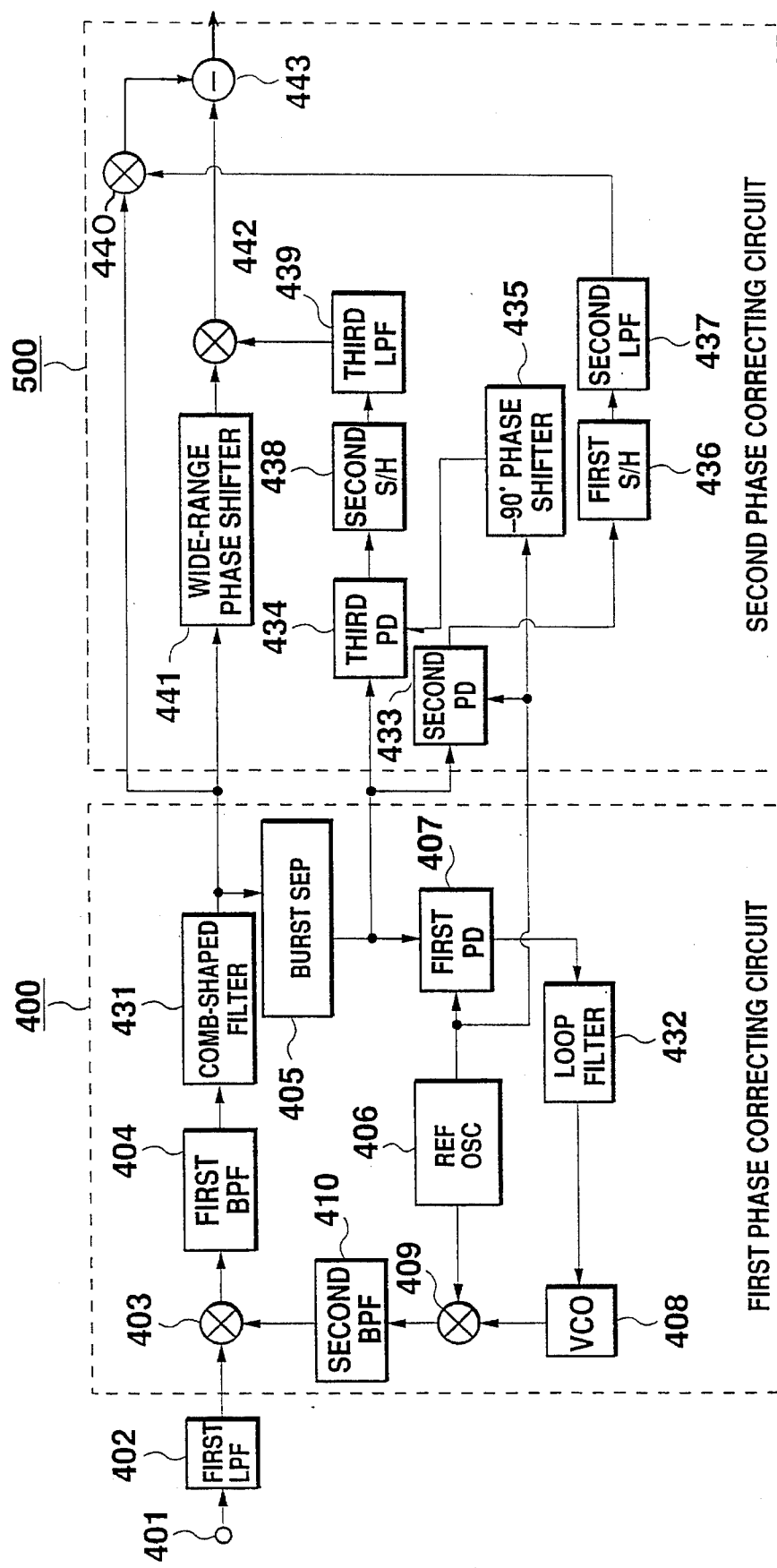
FIG. 15 is a block diagram showing a color signal processing circuit according to a fourth embodiment.

FIG. 15 shows a color signal processing circuit, in a home VTR of the VHS method, according to a fourth embodiment. In FIG. 15, a PLL circuit 400 is similar in construction to the PLL circuit 100 of the first embodiment of FIG. 1 and corrects relatively low frequency components in the input phase shift at an input terminal 401.

Relatively high frequency components in the input phase shift at the input terminal 401, which components could not removed in the PLL circuit 400 serving as a first phase correcting circuit, is transmitted to a second phase correcting circuit 500.

In the second phase correcting circuit 500 in FIG. 15, reference numeral 433 designates a second phase detector to which the output signal $e^{j\psi}$ ($\psi$: phase difference with respect to the reference signal) of a burst separatoe 405 and is compared in phase with the output of a reference signal oscillator 406 to obtain $\sin \psi$ component of the phase of the color burst signal in the output of the second phase detector 433.

Figure 16A:
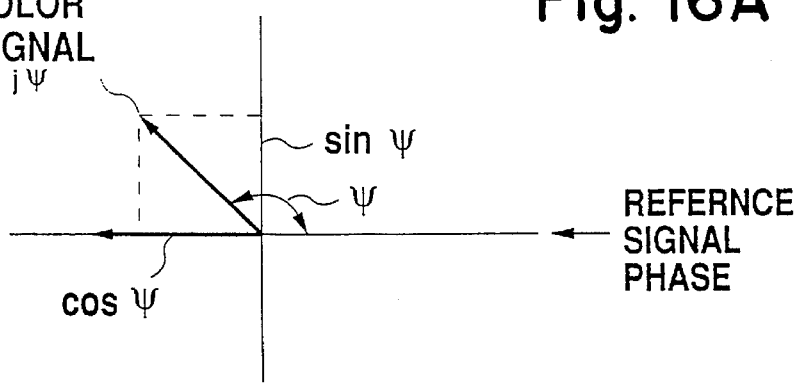
FIGS. 16(a) and 16(b) are diagrams showing the phase correcting process in the fourth embodiment.

434, 435 designate a third phase detector and a −90° phase shifter; the output signal of the burst separator 405 is supplied to the third phase detector 434, and the phase of the output signal of the reference signal oscillator 406 is compared with the phase of a signal, which is shifted by −90° by the phase shifter 435, so that $\cos \psi$ components of the phase of a color burst signal is obtained in the output of the third phase detector 434, as shown in FIG. 16(a).

436 designates a first sample hold circuit to which the output signal of the second phase detector 433 is supplied. Because a phase error cannot be detected by the color burst signal portion, a suitable error voltage is obtained even in the color signal portion following to the color burst signal by sampling the error voltage of the color burst portion and holding the error voltage for one horizontal period.

437 designates a second low-pass filter to which the output signal of the sample hold circuit 436 is supplied and in which unnecessary high frequency range components of the supplied output signal are removed.

438, 439 designate a second sample hold circuit and a third low-pass filter, respectively; the output signal of the third phase detector 434 is supplied to the second sample hold circuit 438 where the error voltage of the color burst portion is held, whereupon the output signal of the third phase detector 434 is led to the third low-pass filter 439 where unnecessary high frequency range components are removed. By the foregoing procedure, remaining phase error included in the output signal of a comb-shaped filter 431 is detected.

440 designates a first multiplier to which the output signal $e^{j\psi}$ of the comb-shaped filter 431 is supplied and in which a product of the output signal of the comb-shaped filter 431 and the output signal of the second low-pass filter 437 is obtained so that the output signal of the first multiplier 440 will be $e^{j\psi} \cdot \sin \psi$.

441, 442 designate a wide-band phase shifter and a second multiplier, respectively; the output signal $e^{j\psi}$ of the comb-shaped filter 431 is shifted in phase by −90° by the wideband phase shifter 441, and as a result, the shifted output signal will thereby become $-je^{j\psi}$. This output signal $-je^{j\psi}$ is supplied to the second multiplier 442 where a product of this supplied output signal and the output signal of the third low-pass filter 439 is obtained and, as a result, the output signal of the second multiplier 442 will become $-je^{j\psi}\cdot\cos\psi$.

443 designates a subtracter which subtracts the output of the second multiplier 442 from the output signal of the first multiplier 440 to output the following:

$$e^{j\psi}\cdot\sin\psi + je^{j\psi}\cdot\cos\psi \qquad (7)$$

The formula (7) yields as follows:

$$e^{j\psi}(\sin\psi + j\cos\psi) = e^{j\psi}\cdot j \cdot e^{-j\psi} \qquad (8)$$
$$= j$$

Figure 16B:
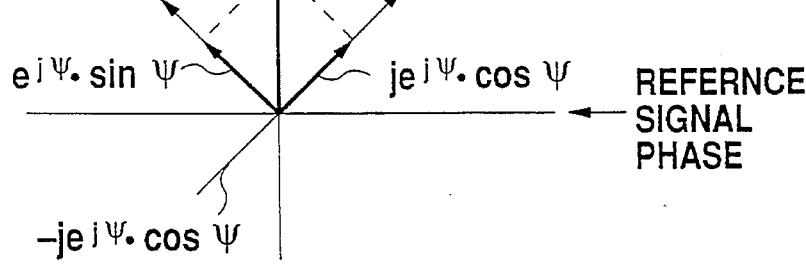

Namely, the formula (8) shows that the phase of the color burst signal is fixed at +90° with respect to the phase of the reference signal, irrespective of the phase difference $\psi$ of the phase of the color burst signal and the phase of the reference signal, as shown in FIG. 16(b).

The second and third phase detectors 433, 434, the −90° phase shifter 435, the first and second sample hold circuits 436, 438, the second and third low-pass filters 437, 439, the wide-band phase shifter 441, the first and second multipliers 440, 442, the subtracter 443 jointly constitute the second phase correcting circuit 500. The second phase correcting circuit 500, unlike the first phase correcting circuit 400, is in the form of an open loop.

Of the operations of the above construction, the manner in which a color signal having a phase difference ±Θ with respect to the phase $\psi$ of the color burst signal varies will now be described.

The color signal can be represented by $e^{j}(\psi\pm\Theta)$. Therefore, $$\begin{aligned}
e^{j(\psi\pm\Theta)}\cdot\sin\psi + je^{j(\psi\pm\Theta)}\cdot\cos\psi &= e^{j(\psi\pm\Theta)}(\sin\psi + j\cos\psi)\\
&= e^{j(\psi\pm\Theta)}\cdot je^{-j\psi}\\
&= je^{j(\psi\pm\Theta-\psi)}\\
&= je^{j(\pm\Theta)}
\end{aligned}$$

This indicates that the phase difference +Θ with respect to the phase of the color burst signal is held.

The frequency characteristic restricting elements in the first phase correcting circuit 500 are the first and second sample hold 436, 438 and the second and third low-pass filters 437, 439. The frequency characteristic of the first and second sample hold circuits 436, 438 is such that assuming that in the case of a zero hold circuit which holds the sampled value, the holding time is T(in this embodiment, T=H, H: one horizontal period), a transmission function G(s) is expressed as follows:

$$G(s) = \frac{1-e^{-sT}}{s}$$

Here, if $s=j\omega$, an absolute value $|G(j\omega)|$ of $G(j\omega)$ can be obtained as follows:

$$|G(j\omega)| = \frac{2\pi}{\omega s}\left|\frac{\sin\pi(\omega/\omega s)}{\pi(\omega/\omega s)}\right|$$

$$\omega s = (2\pi/T) = 2\pi fH$$

where fH is a horizontal frequency.

Figure 17:
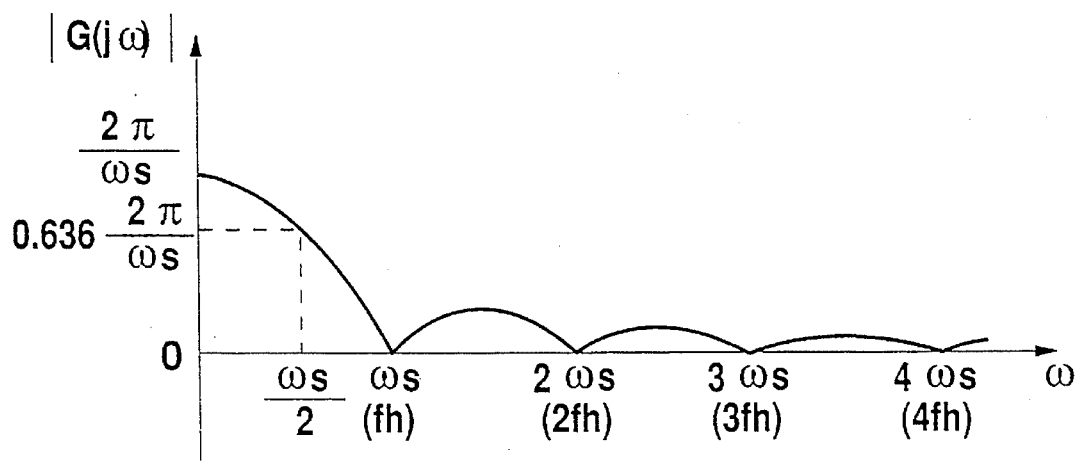
FIG. 17 is a graph showing a frequency characteristic of a zero hold circuit in the fourth embodiment.

FIG. 17 shows the frequency characteristic of $|G(j\omega)|$, from which it turns out that the zero hold circuit shows a low-pass characteristic. The purpose of the second and third low-pass filters is to remove noise components included in the output signals of the first and second sample hold circuits 436, 438. Consequently, if the signal/noise ratio of the color burst signal is good, the cut-off frequency should be set to high; if the signal/noise ratio is not good, the cut-off frequency should be set to low.

In the case of an ordinary home VTR, the cut-off frequency is set to about 1 KHz. Because the cut-off frequency of the first and second sample hole circuits 436, 438 is about 5 KHz, their response characteristic is determined substantially by the second and third low-pass filters 437, 439.

By the foregoing operation, the remaining phase shift components included in the output signal of the first phase correcting circuit 400 can be removed substantially perfectly by the second phase correcting circuit 500.

As described above, according to the fourth embodiment, partly since the phase shift of relatively low frequency of the input color signal is reduced by the closed loop control according to the first phase correcting circuit 400, and partly since the remaining phase error components, which could not be removed by the closed loop control, are corrected by the open loop control according to the second phase correcting circuit 500 having a common reference signal with the closed loop control system of the first phase correcting circuit 400, it is possible to narrow the range of the open loop control so that the change of control characteristic due to the drift, which is a disadvantage of the open loop system, can be restrained, thus adding no restriction to the response characteristic of the open loop control.

Figure 18:
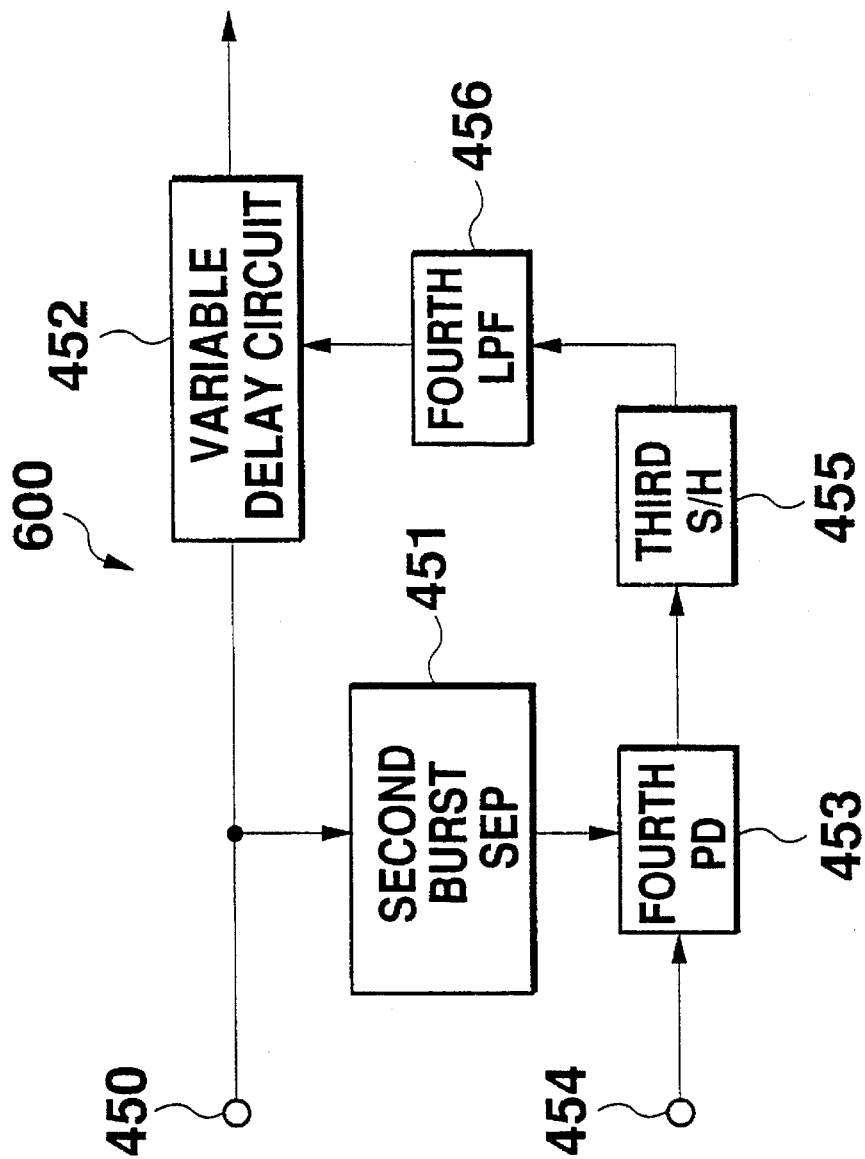
FIG. 18 is a block diagram showing a second phase correcting circuit according to a fifth embodiment.
Figure 19:
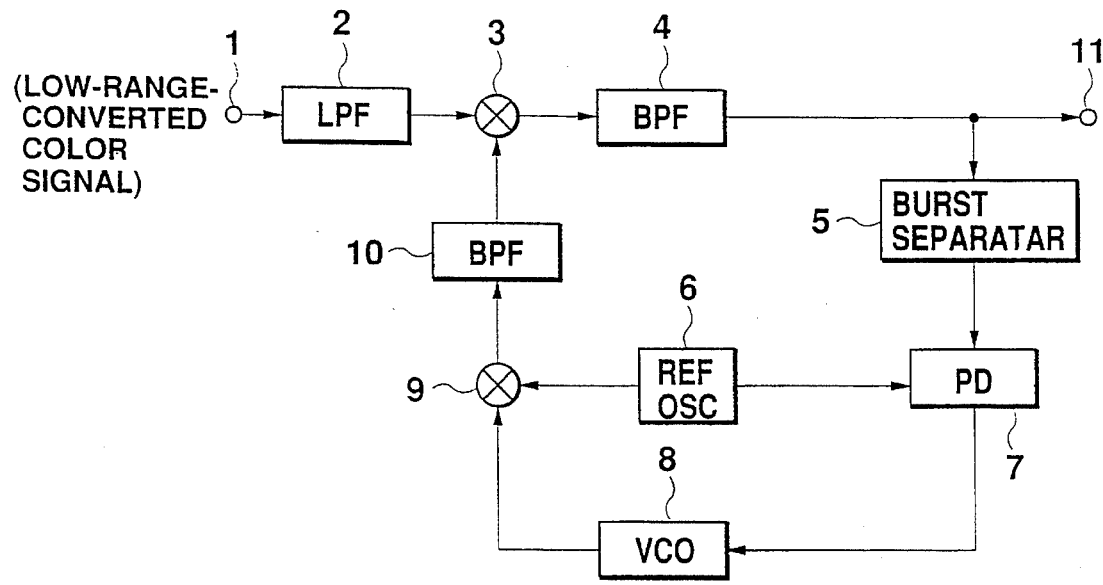
FIG. 19 is a block diagram of a color signal processing circuit of the prior art.
Figure 20:
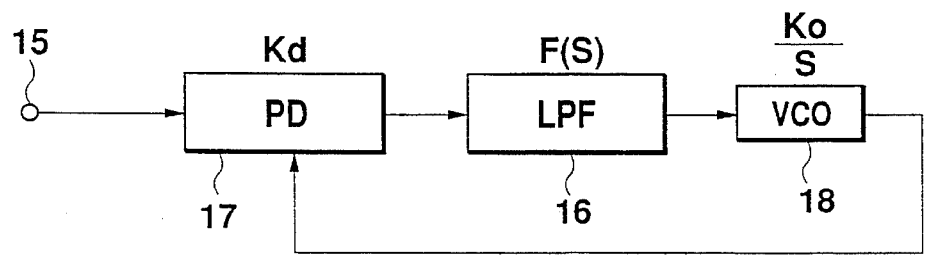
FIG. 20 is a block diagram showing a PLL circuit of the prior art.
Figure 21:
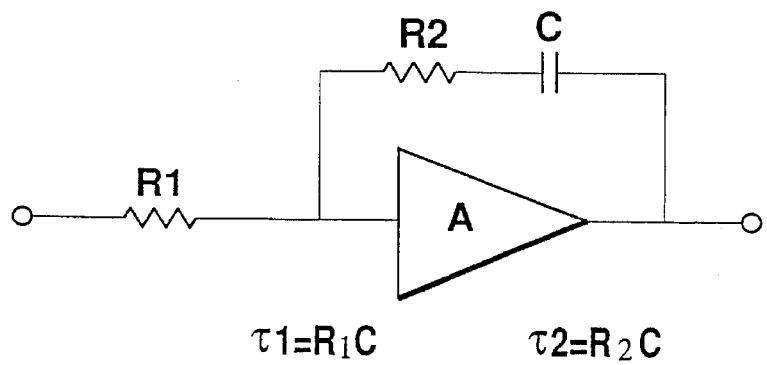
FIG. 21 is a diagram showing a loop filter of the prior art PLL circuit.
Figure 24A:
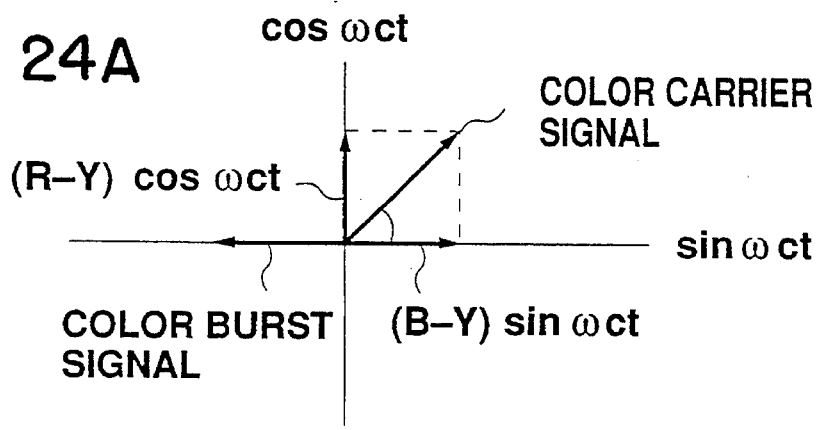
FIGS. 24(a) and 24(b) are vector diagrams each showing a phase shift in the prior art.
Figure 24B:
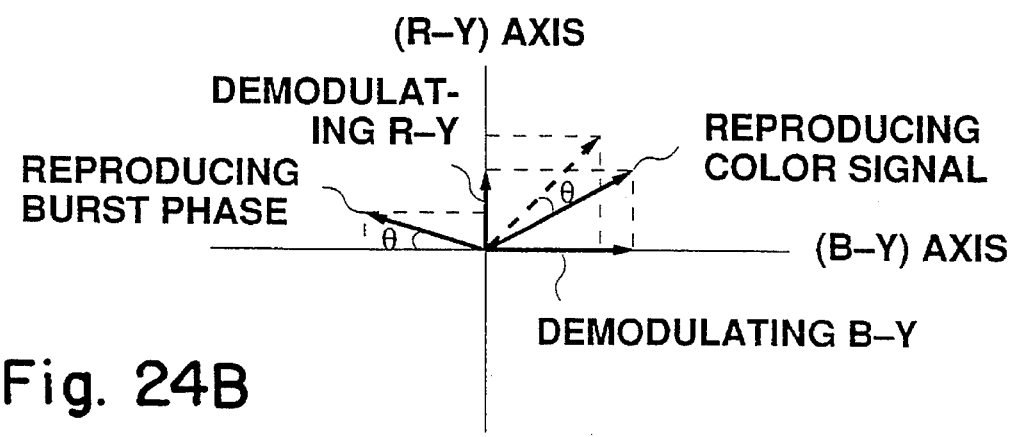
Figure 22:
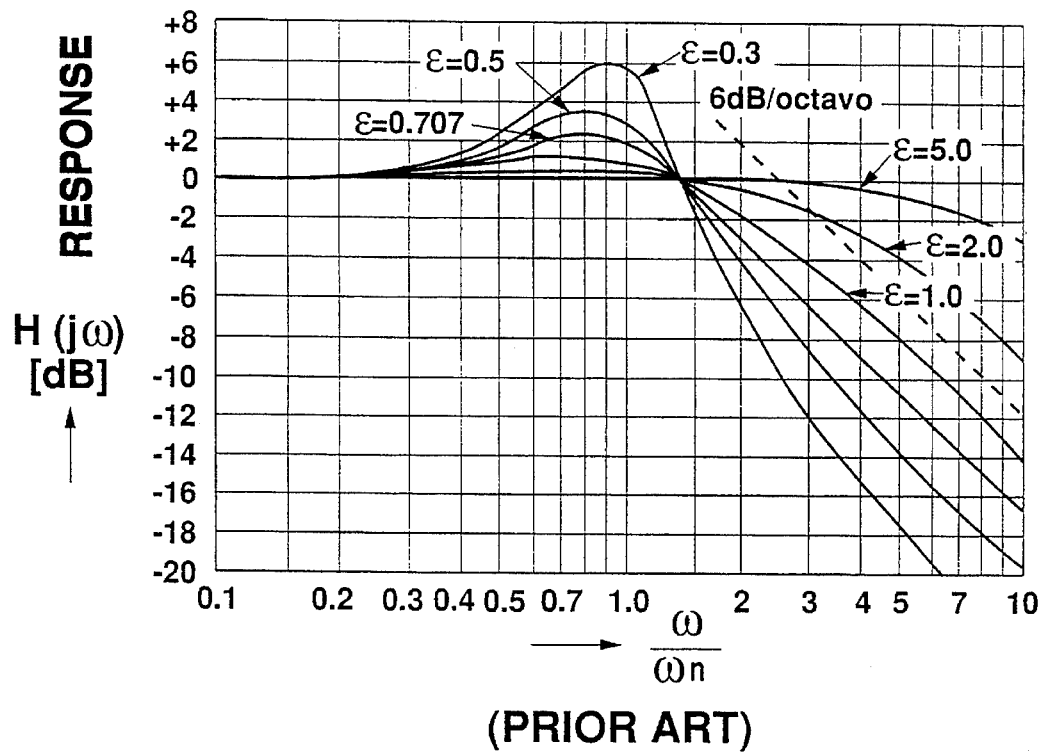
FIG. 22 is a graph showing frequency responses of the PLL circuit.
Figure 23:
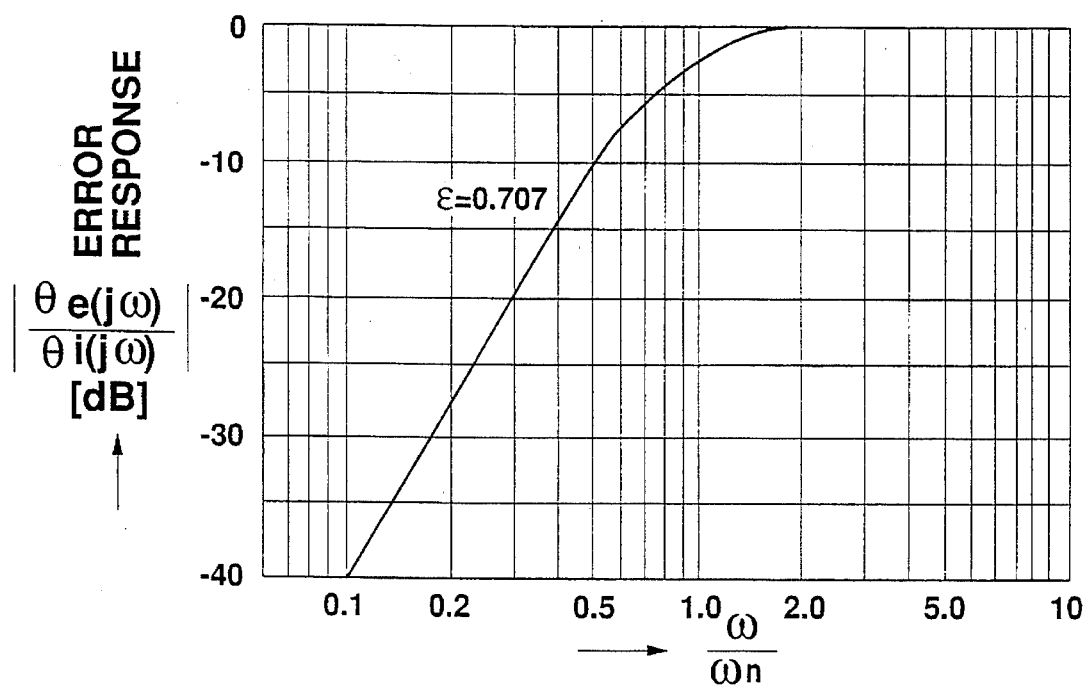
FIG. 23 is a graph showing an error coefficient of the PLL circuit.

The second phase correcting circuit 500 may be any other form if it has an open loop construction. FIG. 18 shows a second phase correcting circuit 600 according to a fifth embodiment.

In FIG. 18, reference numeral 450 designates an input terminal to which the output signal of the first phase correcting circuit 400 is inputted; 451, a second burst separator; and 452, a variable delay line. In the second burst separator 451, a color burst signal in the input color signal is extracted, and the output signal of the second burst separator 451 is supplied to a fourth phase detector 453. The fourth phase detector 453 compares the color burst signal in phase with the reference signal inputted from an terminal 454, and outputs a voltage according to such phase difference.

455, 456 designate a third sample hold circuit and a fourth low-pass filter, respectively; the potential of the color burst portion of the output signal of the fourth phase detector 453 is held by the third sample hold circuit 455 for one horizontal period, and thereafter, unnecessary high frequency components of the output signal of the fourth phase detector 453 are removed by the fourth low-pass filter 456. The output signal of the fourth low-pass filter 456 controls the variable delay line 452 in which the amount of delay varies according to the voltage change, and as a result, a color signal from which the phase shift is removed is obtained as the output signal of the variable delay line 452.

Also with this arrangement of FIG. 18, the substantially same result as that of the second phase correcting circuit 500 can be obtained.

Further, in this embodiment, each of the first, second and third sample hold circuits 436, 438, 455 is a zero hold circuit which holds the sampled voltage for one horizontal period. The number of degrees of a hold circuit should by no means be limited to a specific example. If a primary hold circuit such that sampled values are distributed on a straight line is used, it is possible to improve the response characteristic.

As described above, according to the fifth embodiment, partly since the phase shift components of low frequency are reduced by the first phase correcting circuit in the form of closed loop such that the phase of the color burst signal of the output color signal coincides with the phase of the reference signal, and partly since the remaining phase error components, which could not be removed by the closed loop of the first phase correcting circuit, are corrected by the open loop of the second phase correcting circuit, which has a common reference signal with the first phase correcting circuit, it is possible to narrow the correcting range of the open loop system, without restricting the response characteristic of the second phase correcting circuit in the open loop system. Therefore, adequate response characteristic can be achieved even to the input signal whose phase would shift quickly, so that stable phase correction is possible for a wide band, thus restraining non-uniform color tone, horizontal drag noises of a color signal, etc. considerably.

What is claimed is:

1. A color signal processing circuit for producing a color signal from a video signal in which a low-range-converted color signal is multi-plexed over a low frequency range of a frequency-modulated luminance signal, comprising:

a phase correcting circuit for correcting an input low-range color signal into an output color signal and for synchronizing the output color signal with a reference signal to produce a carrier frequency;

said phase correcting circuit including, a reference signal oscillator for generating said reference signal which is at least a phase reference for a color signal, a burst separator circuit for extracting a color burst signal from the color signal and providing a frequency-converted burst signal, a frequency of the color burst signal being converted into a carrier frequency, phase detector means for detecting a phase difference between said color burst signal and said reference signal, a variable frequency oscillator controlled by said phase detector means, and frequency converting means for converting the frequency of the input color signal with an output signal from said variable frequency oscillator as a carrier;

said phase detector means detecting a phase difference between the frequency-converted burst signal and said reference signal;

a first sample hold circuit for detecting a voltage potential of a burst signal portion of a signal outputted from said phase detector means and for holding said voltage potential for one horizontal period;

a phase modulator for phase-modulating said reference signal by a signal outputted from said first sample hold circuit; and a color signal demodulator for demodulating an output of said phase correcting circuit by using an output signal of said phase modulator as a demodulating carrier.

2. The color signal processing circuit as claimed in claim 1, wherein said phase detector means includes a phase detector for detecting the difference between the frequency-converted burst-signal and said reference signal.

3. A color signal processing circuit for producing a color signal from a video signal in which a low-range-converted color signal is multi-plexed over a low frequency range of a frequency-modulated luminance signal, comprising:

a phase correcting circuit for correcting an input low-range color signal into an output color signal for synchronizing the output color signal with a reference signal to produce a carrier frequency;

said phase correcting circuit including, a reference signal oscillator for generating said reference signal which is at least a phase reference for a color signal, a burst separator circuit for extracting a color burst signal from the color signal and providing a frequency-converted burst signal, a frequency of said color burst signal being converted into a carrier frequency, phase detector means for detecting a phase difference between said color burst signal and said reference signal, a variable frequency oscillator controlled by said phase detector means, and frequency converting means for converting the frequency of the input color signal with an output signal from said variable frequency oscillator as a carrier;

said phase detector means detecting a phase difference between the frequency-converted burst signal and said reference signal;

a first sample hold circuit for detecting a first voltage potential of a burst signal portion of a signal outputted from said phase detector means and for holding said first voltage potential for one horizontal period;

a first multiplier for producing a product of a signal outputted from said first sample hold circuit and a signal outputted from said reference signal oscillator;

a first phase shifter for shifting a phase of said reference signal outputted from said reference signal oscillator by −90°;

a first phase detector for detecting a phase difference between said color burst signal and signal outputted from said first phase shifter;

a second sample hold circuit for detecting a second voltage potential of a burst signal portion of a signal outputted from said first phase detector and for holding said second voltage potential for one horizontal period;

a second multiplier for producing a product of a signal outputted from said second sample hold circuit and a signal outputted form said first phase shifter;

a mixing circuit for mixing a signal outputted from said first multiplier with a signal outputted from said second multiplier;

phase changing means for changing a phase of a signal outputted from said mixing circuit; and a color signal demodulator for demodulating an output of said phase correcting circuit by using an output signal of said phase changing means as a demodulating carrier.

4. The color signal processing circuit as claimed in claim 3, wherein said phase detector means includes a phase detector for detecting the difference between the frequency-converted burst-signal and said reference signal.

5. The color signal processing circuit as claimed in claim 3, wherein said phase changing means comprises:

a second phase shifter for shifting a phase of a signal outputted from said mixing circuit by −90°; and a converter for shifting a phase of said signal outputted from said mixing circuit by 180°;

said color signal demodulator demodulating a signal outputted from said second phase shifter and a signal outputted from said converter, respectively, into carriers and demodulating color signals outputted from said phase correcting circuit into color signals of base bands of color-difference signals.

6. The color signal processing circuit as claimed in claim 5, wherein said phase detector means includes a phase detector
for detecting the difference between the frequency-converted burst-signal and said reference signal.

7. The color signal processing circuit as claimed in claim 5, further comprising:
an amplitude adjusting circuit for balancing the base bands of said color-difference signals.

8. The color signal processing circuit as claimed in claim 7, wherein said phase detector means includes a phase detector
for detecting the difference between the frequency-converted burst-signal and said reference signal.

9. A color signal processing circuit for producing a color signal from a video signal in which a low-range-converted color signal is multiplexed over a low frequency range of a frequency-modulated luminance signal, comprising:
a phase correcting circuit for correcting an input low-range color signal into an output color signal for synchronizing the output color signal with a reference signal to produce a carrier frequency;
said phase correcting circuit including,
a reference signal oscillator for generating said reference signal which is at least a phase reference for a color signal,
a burst separator circuit for extracting a color burst signal from the color signal and producing a frequency-converted burst signal, a frequency of said color burst signal being converted into a carrier frequency,
phase detector means for detecting a phase difference between said color burst signal and said reference signal, a variable frequency oscillator controlled by said phase detector means, and
frequency converting means for converting the frequency of the input color signal with an output signal from said variable frequency oscillator as a carrier;
said phase detector means detecting a phase difference between the frequency-converted burst signal and said reference signal;
a first sample hold circuit for detecting a first voltage potential of a burst signal portion of a signal outputted from said phase detector means and for holding said first voltage potential for one horizontal period;
a first multiplier for producing a product of a signal outputted from said first sample hold circuit and signal outputted from said phase correcting circuit;
a first phase shifter for shifting a phase of said reference signal outputted from said reference signal oscillator by −90°;
a first phase detector for detecting a phase difference between said color burst signal and signal outputted from said first phase shifter;
a second sample hold circuit for detecting a second voltage potential of a burst signal portion of a signal outputted from said first phase detector and for holding said second voltage potential for one horizontal period;
a wide-band phase shifter for shifting a phase of a corrected color signal outputted from said phase correcting circuit by −90°;
a second multiplier for producing a product of a signal outputted from said second sample hold circuit and a signal outputted from said wide-band phase shifter; and
a mixing circuit for mixing a signal from said first multiplier with a signal from said second multiplier.

10. The color signal processing circuit as claimed in claim 9, wherein said phase detector means includes a phase detector
for detecting the difference between the frequency-converted burst-signal and said reference signal.

11. A color signal processing circuit for producing a color signal from a video signal in which a low-range-converted color signal is multi-plexed over a low frequency range of a frequency-modulated luminance signal, comprising:
a phase correcting circuit for correcting an input low-range color signal into an output color signal for synchronizing the output color signal with a reference signal to produce a carrier frequency;
said phase correcting circuit including,
a reference signal oscillator for generating said reference signal which is at least a phase reference for a color signal,
a burst separator circuit for extracting a color burst signal from the color signal and producing a frequency-converted burst signal, a frequency of said color burst signal being converted into a carrier frequency,
phase detector means for detecting a phase difference between said color burst signal and said reference signal, a variable frequency oscillator controlled by said phase detector means, and
frequency converting means for converting the frequency of the input color signal with an output signal from said variable frequency oscillator as a carrier;
said phase detector means detecting a phase difference between the frequency-converted burst signal and said reference signal;
a sample hold circuit for detecting a voltage potential of a burst signal portion of a signal outputted from said phase detector means and for holding said voltage potential for one horizontal period; and
a variable delay line in which an amount of delay varies according to an amount of voltage of a signal outputted from said sample hold circuit and to which a color signal from said phase correcting circuit is inputted;
said variable delay line eliminating phase fluctuation by correcting a phase shift of said color signal inputted from said phase correcting circuit depending on a change in an amount of delay.

12. The color signal processing circuit as claimed in claim 11, wherein said phase detector means includes a first phase detector and a second phase detector,
said second phase detector detecting the difference between the frequency-converted burst-signal and said reference signal.

13. A color signal processing method for producing a color signal from a video signal in which a low-range-converted color signal is multiplexed over a low frequency range of a frequency-modulated luminance signal, comprising the steps of:
(a) synchronizing an output of a phase correcting circuit with a reference signal to produce a carrier frequency;
said step (a) including the sub steps of,
(a1) generating the reference signal which is at least a phase reference for a color signal,
(a2) extracting a color burst signal from the color signal and producing a frequency-converted burst signal, a frequency of the color burst signal being converted into a carrier frequency, and
(a3) detecting a phase difference between the color burst signal and the reference signal;

(b) detecting a phase difference between the frequency-converted burst signal and the reference signal and generating a signal;

(c) detecting a voltage potential of a burst signal portion of the signal generated in said step (b);

(d) holding the voltage potential for one horizonal period to produce a held signal;

(e) phase-modulating the reference signal by the held signal of said step (d) to produce a phase modulated signal; and (f) demodulating the color signal with the phase modulated signal.

14. A color signal processing method for producing a color signal from a video signal in which a low-range-converted color signal is multiplexed over a low frequency range of a frequency-modulated luminance signal, comprising the steps of:

(a) synchronizing an output of a phase correcting circuit with a reference signal to produce a carrier frequency;

said step (a) including the sub steps of,
(a1) generating the reference signal which is at least a phase reference for a color signal,
(a2) extracting a color burst signal from the color signal and producing a frequency-converted burst signal, a frequency of the color burst signal being converted into a carrier frequency, and
(a3) detecting a phase difference between the color burst signal and the reference signal;

(b) detecting a phase difference between the frequency-converted burst signal and the reference signal and generating a signal;

(c) detecting a voltage potential of a burst signal portion of the signal created in said step (b);

(d) holding the voltage potential for one horizontal period to produce a first held signal;

(e) producing a product of the first held signal of said step (d) and the reference signal to produce a first product signal;

(f) shifting a phase of the reference signal by −90°;

(g) detecting a phase difference between the color burst signal and the shifted signal of said step (f) and generating a phase difference signal;

(h) detecting a voltage potential of a burst signal portion of the phase difference signal created by said step (g);

(i) holding the voltage potential for one horizontal period to produce a second held signal;

(j) producing a product of the second held signal of said step (i) and the shifted signal of said step (f) to produce a second product signal;

(k) mixing the first product signal of said step (e) with the second product signal of said step (j) to produce a mixing signal;

(l) changing a phase of the mixing signal of said step (k) to produce a phase change signal; and (m) demodulating the color signal with the phase change signal of said step (l).

15. The color signal processing method as claimed in claim 14, wherein said step (l) comprises the sub steps of:

(l1) shifting a phase of the mixing signal of said step (k) by −90°.

(l2) shifting a phase of the mixing signal of said step (k) by 180°;

(l3) demodulating the shifted signal of said step (l1) and the shifted signal of said step (l2), respectively, into carriers; and (l4) demodulating color signals into color signals of base bands of color-difference signals.

16. The color signal processing method as claimed in claim 15, further comprising the step of:

(n) balancing the base bands of the color-difference signals.

17. A color signal processing method for producing a color signal from a video signal in which a low-range-converted color signal is multiplexed over a low frequency range of a frequency-modulated luminance signal, comprising the steps of:

(a) synchronizing an output of a phase correcting circuit with a reference signal to produce a carrier frequency;

said step (a) including the sub steps of,
(a1) generating the reference signal which is at least a phase reference for a color signal,
(a2) extracting a color burst signal from a color signal and providing a frequency-converted burst signal, a frequency of the color burst signal being converted into a carrier frequency, and
(a3) detecting a phase difference between the color burst signal and the reference signal;

(b) detecting a phase difference between the frequency-converted burst signal and the reference signal to produce a phase differnce signal;

(c) detecting a voltage potential of a burst signal portion of the phase difference signal created by said step (b);

(d) holding the voltage potential for one horizontal period to produce a first held signal;

(e) producing a product of the first held signal of said step (d) and the corrected color signal created by said step (a);

(f) shifting a phase of the reference signal outputted by −90°;

(g) detecting a phase difference between the color burst signal and the shift signal of said step (f);

(h) detecting a voltage potential of a burst signal portion of a signal created by said step (g);

(i) holding the voltage potential for one horizontal period to produce a second held signal;

(j) wide-band shifting a phase of a corrected color signal created by said step (a) by −90° to produce a shifted signal;

(k) producing a product of the second held signal of said step (h) and the shifted signal of said step (j); and (m) mixing the signal of said step (e) with the signal of said step (k).

18. A color signal processing method for producing a color signal from a video signal in which a low-range-converted color signal is multiplexed over a low frequency range of a frequency-modulated luminance signal, comprising the steps of:

(a) synchronizing an output of a phase correcting circuit with a reference signal to produce a carrier frequency;

said step (a) including the sub steps of:
(a1) generating the reference signal which is at least a phase reference for a color signal,
(a2) extracting a color burst signal from the color signal and producing a frequency-converted burst signal, a frequency of the color burst signal being converted into a carrier frequency, and
(a3) detecting a phase difference between the color burst signal and the reference signal;

(b) detecting a phase difference between the frequency-converted burst signal and the reference signal to produce a phase difference signal;

(c) detecting a voltage potential of a burst signal portion of the phase difference signal created by said step (b);

(d) holding the voltage potential for one horizontal period to produce a held signal;

(e) delaying the color signal by an amount of delay which varies according to an amount of voltage of the held signal of said step (d); and (f) eliminating phase fluctuation by correcting a phase shift of the color signal depending on a change in an amount of delay.

19. A color signal processing circuit for correcting a phase of a color signal, comprising:

frequency converting means for frequency converting an input color signal into an output color signal;

a reference signal oscillator for generating a phase reference signal for the output color signal;

first phase compensating means for synchronizing a phase of the output color signal with a phase of the reference signal and outputting a phase compensated color signal;

phase error detecting means for detecting a phase error between a phase of said phase reference signal and a phase of said phase compensated color signal; and second phase compensating means for modulating said reference signal based on said phase error, and for modulating said phase compensated color signal based on said modulated reference signal.

20. The color signal processing circuit as claimed in claim 19, wherein said second phase compensating means comprises:

demodulating means for demodulating said phase compensated color signal based on said modulated reference signal.

21. The color signal processing circuit as claimed in claim 19, wherein said first phase compensating means comprises:

said frequency converting means;

a phase detector detecting a phase error between said phase of said phase reference signal and said phase of said phase compensated color signal;

frequency generating means for generating a control signal having a frequency corresponding to an output signal of said phase detector and said phase reference signal; and wherein said frequency converting means frequency converts said input color signal into said output color signal based on said control signal.

22. A color signal processing circuit for correcting a phase of a color signal, comprising:

reference signal generating means for generating a phase reference signal;

first phase compensating means for converting an input color signal into an output color signal, and for reducing time-dependent phase shift in said output color signal based on a comparison between a phase of said output color signal and a phase of said phase reference signal, said first phase compensating means outputting said output color signal with residual phase difference components;

phase error detecting means for detecting an amount of said residual phase difference components; and second phase compensating means, connected to said first phase compensating means, for phase compensating said output color signal output by said first phase compensating means based on output from said phase error detecting means to eliminate said residual phase difference components in said color signal.

23. The color signal processing circuit as claimed in claim 22, wherein said second phase compensating means comprises:

phase modulator means for modulating said phase of said phase reference signal based on said output signal from said phase error detecting means; and demodulating means for demodulating said output color signal output from said first compensating means based on said modulated phase reference signal.

24. The color signal processing circuit as claimed in claim 23, wherein said phase modulator means and said demodulating means form a feed forward loop.

25. The color signal processing circuit as claimed in claim 22, wherein said second phase compensating means includes said phase error detecting means.

26. The color signal processing circuit as claimed in claim 22, wherein said first phase compensating means includes said phase error detecting means.

27. The color signal processing circuit as claimed in claim 22, wherein said second phase compensating means demodulates said output color signal based on output from said phase error detecting means to phase compensate said output color signal.

28. The color signal processing circuit as claimed in claim 22, wherein said first compensating means comprises:

said phase error detecting means;

frequency generating means for generating a control signal having a frequency corresponding to an output signal of said phase error detecting means and said phase reference signal; and a modulator for modulating said input color signal based on said control signal to produce a synchronized output color signal.

29. The color signal processing circuit as claimed in claim 28, wherein said phase error detecting means, frequency generating means and modulator form a feedback loop.

30. The color signal processing circuit as claimed in claim 22, wherein said second compensating means performs said phase compensation within only one time domain.

31. The color signal processing circuit as claimed in claim 30, wherein said second compensating means performs said phase compensation within only the continuous time domain.

* * * * *